(12) United States Patent
Horvitz et al.

(10) Patent No.: US 7,706,964 B2
(45) Date of Patent: Apr. 27, 2010

(54) INFERRING ROAD SPEEDS FOR CONTEXT-SENSITIVE ROUTING

(75) Inventors: Eric J. Horvitz, Kirkland, WA (US); Sridhar Srinivasan, Redmond, WA (US); Murugesan S. Subramani, Issaquah, WA (US); Paul B. Koch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 863 days.

(21) Appl. No.: 11/428,175

(22) Filed: Jun. 30, 2006

(65) Prior Publication Data

US 2008/0004789 A1 Jan. 3, 2008

(51) Int. Cl.
*G08G 1/09* (2006.01)
(52) U.S. Cl. .................................. 701/117; 342/357.13
(58) Field of Classification Search ......... 701/117–119, 701/201, 202, 207–209, 211; 342/357.13; 340/990, 995
See application file for complete search history.

(56) References Cited

U.S. PATENT DOCUMENTS

| | | | |
|---|---|---|---|
| 5,444,442 A | 8/1995 | Sadakata et al. |
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |
| 5,606,695 A | 2/1997 | Dworzecki |
| 5,611,050 A | 3/1997 | Theimer et al. |
| 5,696,503 A | 12/1997 | Nasburg |
| 5,812,069 A | 9/1998 | Albrecht et al. |
| 5,812,865 A | 9/1998 | Theimer et al. |
| 5,822,712 A | 10/1998 | Olsson |
| 5,933,094 A | 8/1999 | Goss et al. |
| 5,987,374 A | 11/1999 | Akutsu et al. |
| 6,047,260 A | 4/2000 | Levinson |

(Continued)

FOREIGN PATENT DOCUMENTS

WO 9800787 1/1998

(Continued)

OTHER PUBLICATIONS

International Search Report for PCT Application No. PCT/US2007/014408, mailed Jan. 7, 2008, 6 pages.

(Continued)

*Primary Examiner*—Dalena Tran
(74) *Attorney, Agent, or Firm*—Wolf, Greenfield & Sacks, P.C.

(57) ABSTRACT

Sensing, learning, inference, and route analysis methods are described that center on the development and use of models that predict road speeds. In use, the system includes a receiver component that receives a traffic system representation, the traffic system representation includes velocities for a plurality of road segments over different contexts. A predictive component analyzes the traffic system representation and automatically assigns velocities to road segments within the traffic system representation, thereby providing more realistic velocities for different contexts where only statistics and/or posted speed limits were available before. The predictive component makes predictions about velocities for road segments at a current time or at specified times in the future by considering available velocity information as well as such information as the properties of roads, geometric relationships among roads of different types, proximal terrain and businesses, and other resources near road segments, and/or contextual information.

20 Claims, 18 Drawing Sheets

U.S. PATENT DOCUMENTS

| | | | |
|---|---|---|---|
| 6,124,826 | A | 9/2000 | Garthwaite et al. |
| 6,236,932 | B1 | 5/2001 | Fastenrath |
| 6,240,364 | B1 | 5/2001 | Kerner et al. |
| 6,298,302 | B2 | 10/2001 | Walgers et al. |
| 6,314,365 | B1 | 11/2001 | Smith |
| 6,317,686 | B1 * | 11/2001 | Ran ............................ 701/210 |
| 6,353,398 | B1 | 3/2002 | Amin et al. |
| 6,381,533 | B1 | 4/2002 | Crane et al. |
| 6,401,027 | B1 | 6/2002 | Xu et al. |
| 6,401,038 | B2 | 6/2002 | Gia |
| 6,445,968 | B1 | 9/2002 | Jalla |
| 6,466,232 | B1 | 10/2002 | Newell et al. |
| 6,480,783 | B1 | 11/2002 | Myr |
| 6,490,519 | B1 * | 12/2002 | Lapidot et al. ............... 701/117 |
| 6,513,046 | B1 | 1/2003 | Abbott, III et al. |
| 6,539,300 | B2 | 3/2003 | Myr |
| 6,549,915 | B2 | 4/2003 | Abbott, III et al. |
| 6,640,212 | B1 | 10/2003 | Rosse |
| 6,650,948 | B1 * | 11/2003 | Atkinson et al. ............... 700/66 |
| 6,672,506 | B2 | 1/2004 | Swartz et al. |
| 6,721,650 | B2 | 4/2004 | Fushiki et al. |
| 6,741,188 | B1 | 5/2004 | Miller et al. |
| 6,744,383 | B1 | 6/2004 | Alfred et al. |
| 6,747,675 | B1 | 6/2004 | Abbott et al. |
| D494,584 | S | 8/2004 | Schlieffers et al. |
| 6,791,580 | B1 | 9/2004 | Abbott et al. |
| 6,796,505 | B2 | 9/2004 | Pellaumail et al. |
| 6,801,223 | B1 | 10/2004 | Abbott et al. |
| 6,812,937 | B1 | 11/2004 | Abbott et al. |
| 6,813,558 | B1 | 11/2004 | Lapstun et al. |
| 6,837,436 | B2 | 1/2005 | Swartz et al. |
| 6,842,877 | B2 | 1/2005 | Robarts et al. |
| 6,882,930 | B2 | 4/2005 | Trayford et al. |
| 6,909,380 | B2 | 6/2005 | Brooke |
| 6,970,131 | B2 | 11/2005 | Percy et al. |
| 6,983,139 | B2 | 1/2006 | Dowling et al. |
| 6,985,810 | B2 | 1/2006 | Moitra et al. |
| 7,010,501 | B1 | 3/2006 | Roslak et al. |
| 7,040,541 | B2 | 5/2006 | Swartz et al. |
| 7,063,263 | B2 | 6/2006 | Swartz et al. |
| 7,171,378 | B2 | 1/2007 | Petrovich et al. |
| 7,195,157 | B2 | 3/2007 | Swartz et al. |
| 7,355,528 | B2 * | 4/2008 | Yamane et al. ......... 340/995.13 |
| 7,385,501 | B2 | 6/2008 | Miller et al. |
| 2001/0029425 | A1 | 10/2001 | Myr |
| 2001/0030664 | A1 | 10/2001 | Shulman et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0010610 | A1 | 1/2002 | Jacobs et al. |
| 2002/0010615 | A1 | 1/2002 | Jacobs |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2002/0103693 | A1 | 8/2002 | Bayer et al. |
| 2003/0018521 | A1 | 1/2003 | Kraft et al. |
| 2003/0046158 | A1 | 3/2003 | Kratky |
| 2003/0046401 | A1 | 3/2003 | Abbott et al. |
| 2003/0065442 | A1 | 4/2003 | Touney |
| 2003/0154476 | A1 | 8/2003 | Abbott, III et al. |
| 2003/0182052 | A1 | 9/2003 | DeLorme et al. |
| 2004/0030670 | A1 * | 2/2004 | Barton ........................ 707/1 |
| 2004/0059622 | A1 | 3/2004 | Mueller |
| 2004/0181495 | A1 | 9/2004 | Grush |
| 2004/0192351 | A1 | 9/2004 | Duncan |
| 2004/0201500 | A1 | 10/2004 | Miller et al. |
| 2005/0004757 | A1 | 1/2005 | Neeman et al. |
| 2005/0027444 | A1 | 2/2005 | Kim |
| 2005/0034078 | A1 | 2/2005 | Abbott et al. |
| 2005/0038596 | A1 | 2/2005 | Yang et al. |
| 2005/0049765 | A1 | 3/2005 | Chetia et al. |
| 2005/0234758 | A1 | 10/2005 | Nishi |
| 2005/0256754 | A1 | 11/2005 | Nastacio |
| 2005/0266858 | A1 | 12/2005 | Miller et al. |
| 2005/0272442 | A1 | 12/2005 | Miller et al. |
| 2005/0288849 | A1 | 12/2005 | Rothman et al. |
| 2006/0019676 | A1 | 1/2006 | Miller et al. |
| 2006/0041379 | A1 | 2/2006 | Brulle-Drews |
| 2007/0208501 | A1 * | 9/2007 | Downs et al. ............... 701/119 |
| 2008/0090591 | A1 | 4/2008 | Miller et al. |
| 2008/0091537 | A1 | 4/2008 | Miller et al. |
| 2008/0161018 | A1 | 7/2008 | Miller et al. |

FOREIGN PATENT DOCUMENTS

| | | |
|---|---|---|
| WO | 9854682 | 12/1998 |
| WO | 0163451 | 8/2001 |
| WO | 0193070 | 12/2001 |
| WO | 2004021306 | 3/2004 |
| WO | 2005036471 | 4/2005 |

OTHER PUBLICATIONS

Simon Handley, et al. Learning to Predict the Duration of an Automobile Trip. Proceedings of the Fourth International Conference on Knowledge Discovery and Data Mining. 1998, pp. 1-5, New York.

John Fawcett, et al. Adaptive Routing for Road Traffic. IEEE Computer Graphics and Applications. May/Jun. 2000, pp. 46-53. vol. 20, No. 3.

Toshihiko Oda, et al. Evaluation of Measured Travel Time Utilizing Two-way Communication in UTMS. Third World Congress on Intelligent Transport Systems. 1996. Orlando, Florida.

Karen Zita Haigh, et al. Exploiting Domain Geometry in Analogical Route Planning. Journal of Experimental and Theoretical AI, 1997 pp. 509-541. vol. 9, No. 4.

John Krumm, et al. The Microsoft Multiperson Location Survey. Aug. 2005, pp. 1-4. Microsoft Research.

Lawrence R. Rabiner. A Tutorial on Hidden Markov Models and Selected Applications in Speech Recognition. Proceedings of the IEEE. Feb. 1989. vol. 77, No. 2. pp. 257-286.

Auto Route. http://www.microsoft.com/uk/homepc/autoroute/see/default.mspx. Last accessed on Mar. 1, 2006. 2006 Microsoft Corporation.

Take a Free Trip on Auto-Pilot. http://www.freetrip.com/. Last accessed on Mar. 1, 2006. 2 pgs.

Jeff Kurtz, et al. Map Navigation Experiment. http://www.itl.nist.gov/iaui/vvrg/nist-icv/experiments/mapnav/mapnav.html. Last accessed on Mar. 1, 2006. 3 pgs.

Stefan Edelkamp, et al. Route planning and map inference with global positioning traces. Computer Science in Perspective. 2003. pp. 128-151. Springer-Verlag New York, Inc.

William H. K. Lam. Comparison of two non-parametric models for daily traffic forecasting in Hong Kong. Journal of Forecasting. Feb. 27, 2006. 2 pgs. John Wiley & Sons, Ltd.

Raffaele Bolla. A new model for network traffic forecast based on user's mobility in cellular networks with highway stretches. International Journal of Communication Systems. Sep. 22, 2004. pp. 911-934. vol. 17, Issue 10. John Wiley & Sons, Ltd.

Joao Paulo Barros. Activities as Behaviour Aspects. http://lglwww.epfl.ch/workshops/uml2002/papers/barros.pdf. Last accessed on Mar. 3, 2006. 6 pgs.

K Meister, et al. Generating daily activity schedules for households using Genetic Algorithms. 5th Swiss Transport Research Conference. Mar. 9-11, 2005. 26 pgs. Monte Verità / Ascona.

S.T. Doherty, et al. The Development of a Unified Modeling Framework for the Household Activity-Travel Scheduling Process. Traffic and Mobility: Simulation-Economics-Environment, eds. W. Brilon, F. Huber, M. Schreckenberg, and H. Wallentowitzpp. pp. 35-56. Berlin: Springer.

Has ITS4mobility the capability to ensure reliable operation and realistic prediction of vehicle arrival and/or departure times? http://www.volvo.com/mobilitysystems/global/en-gb/FAQ/RealisticPredictionsArrivals.htm. Last accessed on Mar. 2, 2006.

TriMet Transit Tracker Implementation. Innovations in Public Transit. Jan. 4, 2005. 7 pgs.

Daniel Ashbrook, et al. Enabling Ad{Hoc Collaboration Through Schedule Learning and Prediction. http://www-static.cc.gatech.edu/fac/Thad.Starner/p/031_20_Activity/chi_mobihoc-2002.pdf. Last accessed on Mar. 2, 2006. 4 pgs.

Mattias Östergren, et al. Road Talk: A Roadside Location-Dependent Audio Message System for Car Drivers. Journal of Mobile Multimedia. Feb. 25, 2005. Pages 47-61. vol. 1, No. 1. Rinton Press.

Joseph Schwartz. Microsoft Releases MapPoint 2002. Directions Magazine. Apr. 24, 2001. pp. 1-4. Directions Media. Glencoe, IL.

Oscar Franzese, et al. Traffic Simulation Application to Plan Real-Time Distribution Routes. Proceedings of the 2002 Winter Simulation Conference. 2002. pp. 1214-1218.

B.L. Smith, et al. Meeting Real—Time Traffic Flow Forecasting Requirements with Imprecise Computations. Computer—Aided Civil and Infrastructure Engineering. May 2003. pp. 201-213. vol. 18, No. 3. Blackwell Publishing.

Fastcommute. http://home.earthlink.net/~fastcommute/. Last accesses on Mar. 1, 2006.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

\* cited by examiner

INFERRING ROAD SPEEDS FOR CONTEXT-SENSITIVE ROUTING

BACKGROUND

Computer-driven route planning applications are utilized every day to aid users in locating points of interest, such as particular buildings, addresses, and the like. Additionally, in several existent commercial applications users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be provided to the user. When zooming out, the user can glean information from the map such as location of the point of interest within a city, state, and/or country, proximity of the point of interest to major freeways, proximity of the point of interest to a specific city, and the like. In some applications, satellite images can be utilized to provide users with additional detail regarding a particular geographic location or region. For example, a prospective purchaser of a house can obtain an overhead satellite image of the house, thereby enabling the prospective purchaser to view lines of occupation, proximity of the house to other adjacent houses, and other information that may be pertinent to the user.

Furthermore, conventional computer-implemented mapping applications often include route planning applications that can be utilized to provide users with directions between different locations. Pursuant to an example, a user can provide a route planning application with a beginning point of travel and an end point of travel (e.g., beginning and ending addresses). The route planning application can include or utilize representations of roads and intersections and one or more algorithms to output a suggested route of travel. These algorithms can output routes depending upon user-selected parameters. For instance, a commercial route planning application can include a check-box that enables a user to specify that she wishes to avoid highways. Similarly, a user can inform the route planning application that she wishes to travel on a shortest route or a route that takes a least amount of time (as determined by underlying algorithms). Over the last several years, individuals have grown to increasingly rely on route planning applications to aid them in everything from locating a friend's house to planning cross-country road trips.

Route planning applications are also no longer confined to desktop computers. Rather, several automobiles are now equipped with standard mapping functionality, wherein the automobiles include graphical displays on a console to provide mapping data and directions to a user. Oftentimes, a compact disk or other storage medium that includes data to enable utilization of route-planning functionality must be purchased and loaded prior to use of the route planning application. As road conditions change, such as speed limits, number of lanes, etc., updates can be provided. Automobiles with GPS functionality (or other location identifying functionality) can additionally include real-time directions, wherein directions are provided to users of the automobile while they travel.

These route planners are fairly reliable in connection with details such as posted speed limits, location of one-way streets, and related information. However, conventional applications that include route-planning functionality make assumptions regarding state of roads. With more specificity, today's route planning applications are built around assumptions of constancy and universality, such that optimal routes provided by the applications are independent of time of day, day of week, and detailed user preferences. In actuality, however, these assumptions do not hold. For example, in many instances, a best route between two points during rush hour in an urban area is not an optimal route at midnight between the same two points. Conventional route planning applications, however, do not take such context into account when providing routes for users. Similarly, different drivers may prefer different routes between the same two points. For example, one driver may avoid highways or particularly difficult merges, or is willing to extend duration of a journey by a few minutes in order to follow a scenic coastal road, while the other driver simply wants to arrive as quickly as possible or to traverse the shortest distance.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Given expanding capabilities of mobile devices and permeation of network-connected devices in the home and workplace, people have become increasingly reliant upon route-planning applications to provide them with directions between two points. Conventional route planning applications are deficient, however, in that they output directions between two points that are independent of context, which does not represent actual driving conditions. For instance, commuters are cognizant of the fact that travel velocity statistics over a particular road segment can differ drastically at different times. Pursuant to one particular example, a road segment at rush hour may take much longer to travel over than a same road segment at midnight.

To make up for these deficiencies, described herein is a robust traffic system representation that enables driving directions to be output that depend upon context associated with the journey, wherein the context can include time the journey will be taken, day of the week that the journey will be taken, weather conditions associated with the journey, events (such as concerts and sporting events) related to the journey, and other suitable contextual information. For instance, the traffic system can include a weighted graph, wherein nodes of the graph represent intersections, edges represent road segments between intersections, and the weights are based at least in part upon travel velocity statistics associated with the road segments/intersections given different contexts. At least a portion of these weights can be determined through sensed velocity data from drivers traveling through a traffic system represented by the traffic system representation.

Given a set of road speeds, and a driver's preferences, a search algorithm can be used to find an optimal or approximately optimal path between two or more points, by searching over different sequences of road segments, considering for each information about the expected road speeds, and then computing properties of the entire trip from this information. Algorithms for doing such searching include full combinatorial search, the Dykstra algorithm, the A* algorithm, and other heuristic search algorithms.

Due to size of some traffic systems, however, it is typically difficult to receive sensed velocity data with respect to each road segment in a traffic system within a single context, let alone multiple contexts of interest. It remains desirable, however, to associate road segments with velocity statistics, and, optionally, to have information about the probability distribution over the road speeds of different roads for different contexts, so as to enable the computation of optimal driving directions given particular contexts.

Accordingly, road velocities can be reasoned about from properties of roads and perhaps limited sensed data. For example, road speeds might be functions of properties of roads or classes of roads (e.g., two lane, four lane, expressway, state highway, county highway, . . . ), the type of area surrounding roads (e.g., commercial, residential, agricultural, . . . ), the terrain that roads pass through, posted speed limits, nearby resources such as shopping areas, recreational parks, etc, and other suitable data relating to road segments/intersections. In addition, other source of information might be used, including weather information, relationships among roads, road types, and road situations, (e.g., traffic jams on nearby sensed arterials), and special geometric relationships between types of roads (e.g., the distance between a road segment from a freeway on-ramp or off-ramp). Given some limited sensed data, statistical methods (including those methods known as machine learning and reasoning techniques) can be employed to generate insights about how to best harness such data, as well as higher-order relationships and patterns among such data, to predict the velocities of road segments in different contexts, including currently active contexts, near future contexts, and more distant future contexts. The methods can be used to construct automated prediction systems that continue to compute probability distributions over the velocities of road segments so as to make this dynamic database available for generating routes that are applicable at the moment or at future times.

Beyond applications to understand the velocities on road segments that have not been sensed directly for contexts at hand, the systems/methods described herein can be applied to performing predictions of velocities for road segments in different regions. For example, the construction of a predictive model for road speeds from properties and a database of partially sensed data in the San Francisco area might provide valuable inferences when applied to roads in other metropolitan areas, e.g., Chicago or Seattle, based on the prediction and/or inference relating to road properties and relationships. In other cases, a system can learn how to adapt a model for the San Francisco system so as to adapt it effectively to a new region without requiring the same intensive effort that was required to build the initial core model, e.g., by changing in a selective manner certain parameters in the model that can be tuned with an analysis of a small training and testing set.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
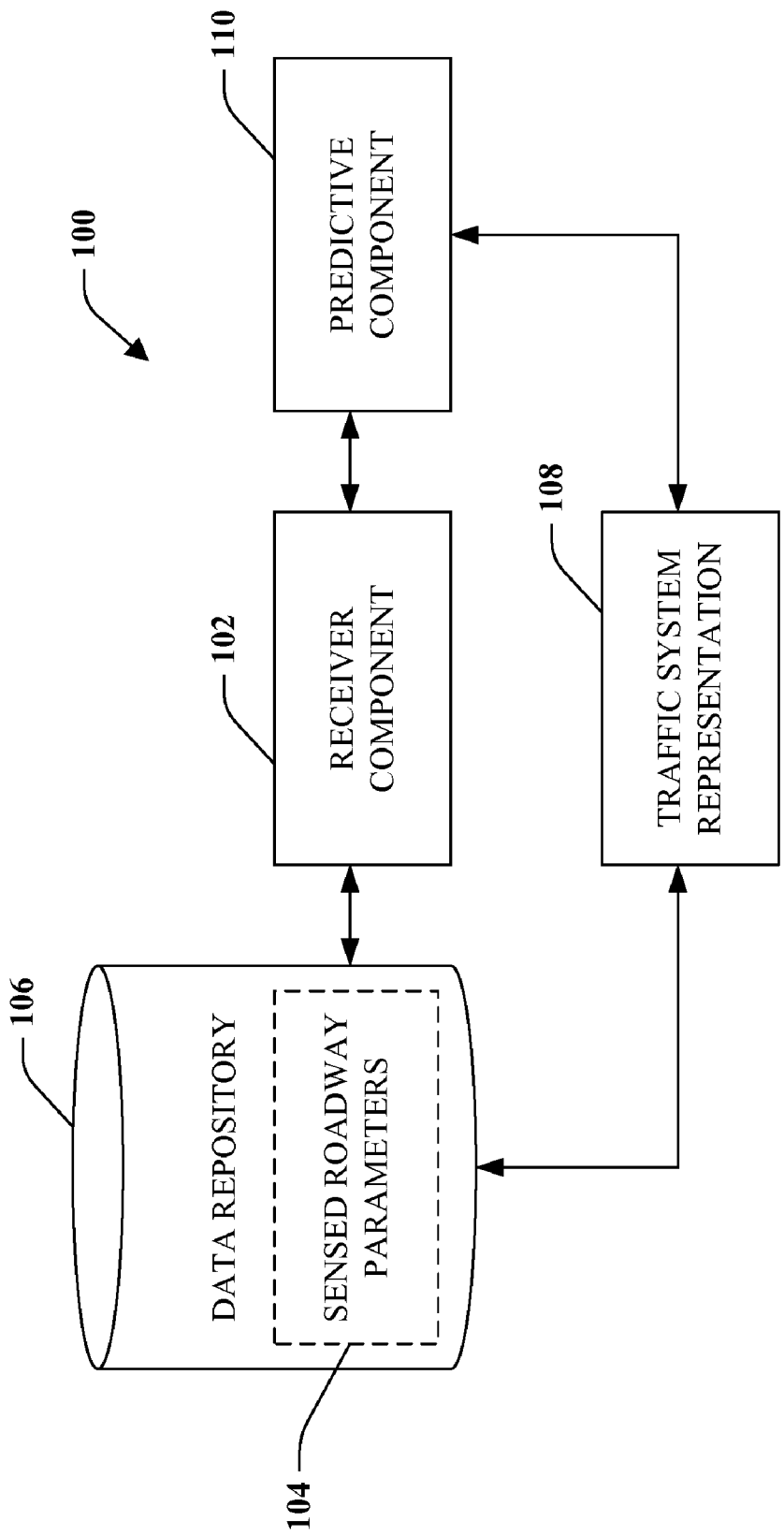
FIG. 1 is a high-level block diagram of a system that can be employed to predict travel velocity statistics for a road segment given various contexts.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g. card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Referring now to FIG. 1, a system 100 that enables creation of a robust route planning application is illustrated. The system 100 includes a receiver component 102 that receives sensed roadway parameters 104 from a data repository 106, wherein the data repository 106 can be resident upon a server, distributed amongst a plurality of servers/clients, resident upon a client, etc. The sensed roadway parameters 106 can include speeds associated with roadway segments given varying contexts. For instance, the sensed roadway parameters 106 can include different speeds for a same roadway segment given different times of day and days of a week. In more detail, commuters in urban areas readily recognize that a speed of a road segment on a weekday during rush hour can be drastically different than a speed of the same road segment at midnight (or during a weekend). The sensed roadway parameters 106 can further include speeds for intersections, where time associated with an intersection may drastically differ given varying contexts. Pursuant to one example, turning left at an intersection near a shopping center during Christmas shopping season at noon can take a significantly greater amount of time when compared to turning left at the same intersection at midnight on a Tuesday. Additionally, the sensed roadway parameters 106 can include speeds given other contexts and/or combinations of contexts. For instance, the sensed roadway parameters can include speeds for times of day and days of a week with respect to weather conditions. Further, the sensed roadway parameters 106 can include speed data with respect to particular road segments when an event, such as a sporting event or concert, has been held in a particular portion of a traffic system.

The sensed roadway parameters 106 can be obtained from users that travel in a particular traffic system. For example, GPS receivers, cell phones (for cell tower-centric information), devices that use WiFi or WiMax, or other suitable location collecting/emitting devices can be employed in connection with creating the sensed roadway parameters 106. Velocities or velocity ratios (actual velocity/posted speed limit) or other statistics about velocities associated with sensed locations of drivers can then be determined based upon time information relating to sensed locations, so long as locations associated with drivers are sensed relatively frequently. Accordingly, the sensed roadway parameters 106 are based upon data collected from drivers that are actually traveling within a traffic system, and such data can be employed in connection with a route planning application (not shown). Therefore, output routes can be based at least in part upon the sensed roadway parameters 106 (which are context-dependent) rather than roadways being associated with constant road speeds (which are typically a function of posted speed limits).

In more detail, a traffic system representation 108 can be defined/created based at least in part upon the sensed roadway parameters 106. Pursuant to one particular example, the traffic system representation 108 can be and/or include a weighted graph, wherein nodes represent intersections, edges represent road segments between intersections, and the weights represent road speed statistics for road segments given different contexts. In other words, the weights of the nodes/edges can change as time changes, as days alter, as weather conditions change, and the like. The sensed roadway parameters 106 can be utilized to weight the nodes and edges. For instance, if the sensed roadway parameters 106 include a speed for a certain road segment at a particular time of day on a weekday, such speed can be mapped to the corresponding edge in the traffic system representation 108 in order to provide a weight to such edge. Even if data is collected from several drivers over a long period of time, however, in large traffic systems it may be extremely difficult to collect data indicative of road speeds, or other potentially useful statistics about velocities on road segments, for each road segment and/or intersection in a traffic system with respect to a wide variety of contexts or combinations of contexts.

A predictive component 110 can be included within the system 100 to aid in predicting/inferring/forecasting road speeds for road segments with respect to which there exists a lack of sensed data. The predictive component 110 can be or include a predictive model that is utilized to predict travel velocity statistics with respect to road segments that are not associated with directly sensed data (over varying contexts, for instance). For example, the predictive component 110 can access the traffic system representation 108 and determine which roadway segments and/or intersections are not associated with collected data for desired contexts. Pursuant to one particular example, the traffic system representation 108 can include contextual categories for weekdays and weekends that are further broken down into blocks of time (e.g., 96 time blocks of 15 minutes). Continuing with this example, the traffic system representation 108 could therefore include 192 different speeds for each road segment of a traffic system represented within the traffic system representation 108 (96 for weekdays and 96 for weekends). The predictive component 110 can access the traffic system representation 108 and locate each edge and/or node that is not, for example, associated with a road speed for each of the 192 possible time blocks.

Once such edges and/or nodes and associated contexts are located, the predictive component 110 can assign road speeds (weights) to the traffic system representation 108. This can be accomplished, for instance, through utilization of a cascading rules-based approach. Pursuant to an example, the predictive component 110 can locate an edge in the traffic system representation 108 that has not been assigned a weight for a particular context. The predictive component 110 can then analyze the edge at related contexts and provide a weight to the edge based upon such analysis. For example, the traffic system representation 108 can include weights for an edge that represents road segment at time chunks 1:30-1:45 a.m. and 2:00-2:15 a.m. The edge, however, is not associated with a weight for the time chunk between 1:45 a.m. and 2:00 a.m. Accordingly, the predictive component 110 can locate such edge and provide the edge with a weight for the time chunk between 1:45 a.m. and 2:00 a.m. that is an average of the weights for the edge at adjacent time chunks. Similarly, the predictive component 110 can employ extrapolation techniques to assign the edge with a suitable weight. If there are no weights associated with adjacent time blocks, for instance, the predictive component 110 can locate similar edges at the same time chunk and assign the at-issue edge with a substantially similar weight as the similar edges. Similarity, for example, can be based upon road segment type, which may be included within the traffic system representation 108. Any suitable measure of similarity, however, is contemplated by the inventors and intended to fall under the scope of the hereto-appended claims. If no similar roads can be located and/or no suitable road speeds can be discerned, the edge can be weighted as a function of a posted speed limit.

Thus, as described above, a cascading rules-based approach can be employed by the predictive component 110 in connection with assigning weights to edges within the traffic system representation 108 (e.g., assigning road speed statistics to road segments over various contexts). The above example cascade of rules has been provided for illustrative purposes only, and the claimed subject matter is not limited to such cascade. The predictive component 110 can also determine road speed estimates for one or more road segments through machine learning techniques.

For example, as described above, the traffic system representation 108 can include edges, nodes, and weights associated therewith, wherein the nodes represent intersections, the edges represent road segments, and the weights represent road speeds given different contexts (time of day, day of week, etc.). The predictive component 110 can utilize machine-learning techniques to locate relationships and patterns amongst road segments given at least a portion of the aforementioned data included within the traffic system representation 108, and the predictive component 110 can employ such relationships and patterns in connection with determining expected road speeds for road segments at different contexts and assigning weights to nodes/edges within the traffic system representation 108 according to the expected road speeds. Thus, the predictive component 110 is effectively utilized to polish/complete the traffic system representation 108, thereby enabling a route planning application to output directions as a function of context.

In more detail regarding the predictive component 110 being or including a predictive model, the predictive component 110 can use partial sensor data (e.g., limited data collected on streets that happen to be traversed at different times by users carrying devices that can aid in tracking location, velocity, and the like) relating to road velocities at different times of day and days of a week to build a model (the traffic system representation 108) that links sets of contextual and structural information to observations. For instance, information sensed from a traffic arterial system can be learned about to predict traffic flows on side streets. Such prediction can be accomplished through utilization of a predictive model (e.g., within the predictive component 110) that predicts road speeds (on roads and in contexts that have not been observed) through reasoning from properties, both real-time and structural. The predictive component 110 can be utilized to annotate (offline or in real-time) all roads within a traffic system, and updated velocities can be placed within the traffic system representation 108. A route planning system (such as one that uses the A* algorithm, the Dykstra algorithm, variants thereof, and/or other suitable algorithms) can identify fastest routes based upon contextual cues, structural cues, and/or combinations thereof. Further, a route planning system can account for user preferences (inferred or explicitly defined) in connection with outputting a route to a user. For example, the user may prefer to drive over country roads rather than freeways, even though traversal of the country roads may not provide a fastest route between two points.

Thus, the system 100 (and other systems/methods described herein) can leverage via learning and generalizing of partial quantities of sensed information and can link a skeleton of a sensed arterial system to previously unsensed portions of a traffic system. Thus, the predictive component 110 can fill in missing sensed velocity data or "holes" via the use of a predictive model which considers multiple properties of road segments and considers the similarity of the structure, road properties, and contextual attributes of sensed roads, so as to assign velocities or a probability distribution over velocities to the road segment for which we may only have a posted speed. Additionally, a predictive model developed by analysis of partially sensed data, properties, geometric relationships, and contextual information developed for a first city can be applied to another city, as these features can be sufficiently abstract to apply to both cities (e.g., distance from a highway trouble spot). As described below, city mapping can be enhanced by the tuning of key parameters to a new city by way of testing certain relationships.

Still further, the system 100 can output directions over varying contexts. For instance, a user can input when they are planning on beginning travel, and directions or routes can be output to a user that are specific to the provided context (even though all road portions in a route may not be associated with sensed data for the particular context). With still more specificity, predictive models can be built that are tuned to predicting the future versus predictions at a current time. For the near future, current or recently observed contextual information can be observed and used to train for traffic flows in the future. In other words, models can be built that predict state of future flows from data previously observed. For predicting into the far future, contextual features that are currently observed (e.g., current traffic flows) can be effectively ignored, and the system 100 can resort to use of previously collected statistics.

Figure 2:
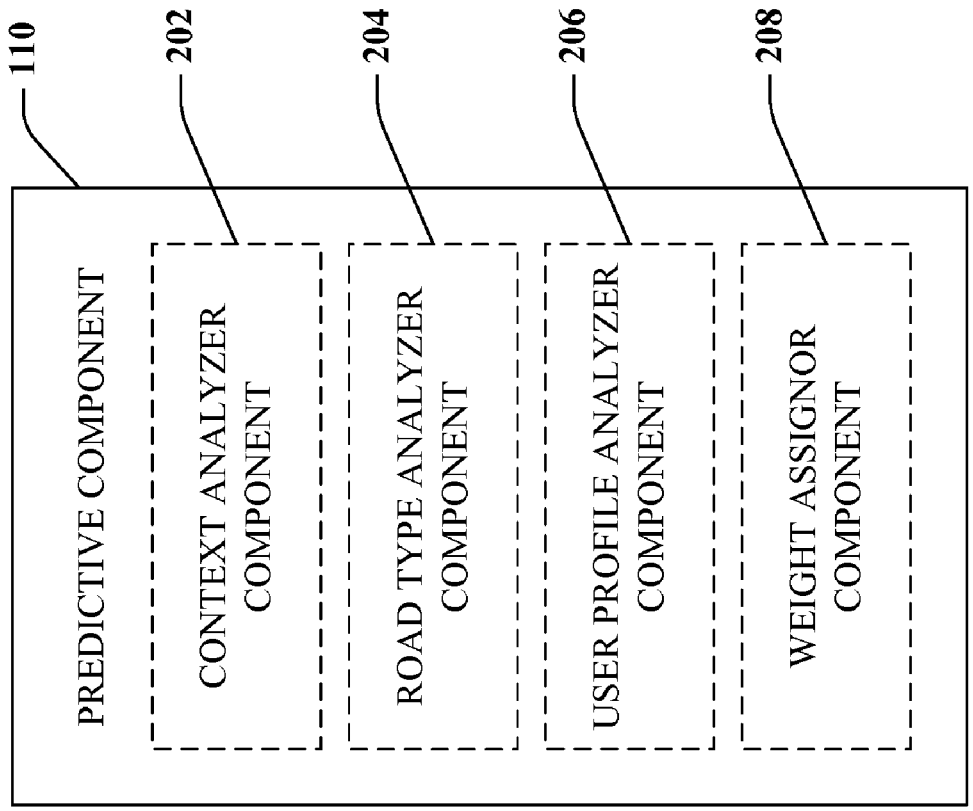
FIG. 2 is a detailed illustration of an example component that can employ cascading rules in connection with inferring travel velocities.

Now turning to FIG. 2, an example of contents of the predictive component 110 is shown and discussed in greater detail. The predictive component 110 shown and described with respect to FIG. 2 utilizes one or more rules in connection with assigning weights to edges within the traffic system representation (FIG. 1). As stated above, however, the predictive component 110 can employ machine-learning techniques together with or as an alternative to the rules/components described herein. The predictive component 110 can include a context analyzer component 202 that reviews a road segment that is not associated with a speed for a desired context. For instance, a road segment may not be associated with a road speed for weekdays between 9:00 p.m. and 9:15 p.m. The context analyzer component 202 can then analyze road speeds that are adjacent to such context (e.g., between 8:45 and 9:00 p.m. and between 9:15 and 9:30 p.m.), and may assign the road segment (at the desired context) with a road speed that is based at least in part upon the road speeds of the adjacent contexts. In another example, these road speeds associated with related contexts can be retained for further processing/analysis.

Additionally, the context analyzer component 202 can review and analyze month of year, season, whether a day is a holiday, weather conditions, road conditions, major events (such as sporting and/or cultural events), sensed traffic patterns (e.g., which may be sensed by a fixed sensing system, sensors from drivers, . . . ), dynamics of traffic flow (e.g., durations of time since particular regions of a traffic system have been reported to be blocked or freed from blockage), reports on any road of blockage or flow, natural language reports of accidents, events, closures, construction, etc., whether a major road has been blocked within a certain radius or road driving distance to a user, distance to a major road that has become blocked, distance to a road that has become blocked within some threshold time, road segments that are part of a bypass, conduit, or alternative routes (to arterial), within some distance or in a radius from a current, recent, or evolving arterial traffic flow problem. Such contextual information can be utilized in connection with updating/creating the traffic system representation 108 and/or outputting a route to a user (given a certain context). Moreover, certain of the contextual information can be marked as outdated or simply ignored if a user requests a route at a time distant in the future (as sensed conditions most likely will have changed). In other cases, formal methods, such as time-series representations and other statistical temporal reasoning methods can be employed that considers the age of observations and the target time of future forecasts in an explicit manner.

The predictive component 110 can further include a road type analyzer component 204 that determines a road type of a road that is not associated with a speed for each desired context. Continuing with the above example, the road type analyzer component 204 can determine if the road segment is a two-lane road or a four lane road. Additionally, the road type analyzer component 204 can discern terrain of a region that includes the road segment as well as zoning information of the road segment, such as whether it is a commercial region, an agricultural region, residential region, etc. This information can be employed together with road speeds of the road segment at similar contexts or separate from such road speeds to estimate a road speed for the road segment. Road types can include, for example, whether the road is a highway, a major road, an arterial road, a street, a ramp, a limited access highway, a ferry connection, etc. Other parameters that can be taken into account include posted speed, number of lanes, two way versus one way, public versus private, toll versus free, paved versus unpaved, physical divider between different directions or not, length of segment, incoming valence (number of streets coalescing into this road), outgoing valence (number of streets the segment branches into), intersections per mile, traffic lights and their density, whether a road segment is part of a typical "trouble spot" (e.g., where traffic jams often occur), flow of traffic at a segment having high variance versus low variance, etc.

Other factors can additionally be contemplated by the road type analyzer component 204, such as proximal terrain surrounding a particular road segment, services nearby a road segment, whether a road segment is near transportation services, travel stops, automotive services, accommodations, shopping, ATMs, banks, emergency assistance centers, city centers, government facilities, educational facilities, business facilities, restaurants, grocery stores, restaurants, bars/nightclubs, recreational facilities, parks, and/or the like. Still further, the road type analyzer component 204 can contemplate relationships between roads, such as geographic proximity to a road, distance from arterial system, distance to a highway on or off-ramp, whether a road is a "conduit" to or from highway (e.g., a major road that can reach the highway or come from the highway by traversing a distance of less than a threshold), whether a road part of one or more "bypass" routes around a major road or arterial, whether a road is part of paths in side streets that route around arterial trouble spots (commonly blocked portion of arterial system), whether a road is part of one or more "alternate" routes (e.g., the road is a part of at least one path that serves as an alternate route to blocked highways), etc.

Higher-level observations can be computed by creating new features as combinations of different features of the same or of different classes of evidence, representing real-time observations and/or properties and/or structural relationships. For example, an observation can be computed that considers a relationship between a target road segment and a currently bottlenecked aspect of the freeway that has been bottlenecked for more than a particular amount of time.

A user profile analyzer component 206 can also be included within the predictive component 110, wherein the user profile analyzer component 206 can review one or more driving profiles of individuals who travel within a traffic system represented by the traffic system representation 108. For instance, different drivers may travel through a similar road segment at different speeds, and profiles can be created for such drivers. In a specific example, a first driver may tend to drive five miles per hour over a posted speed limit (when not inhibited by traffic) while a second driver may tend to drive five miles per hour under the posted speed limit (whether or not inhibited by traffic). With respect to longer journeys, the estimated time of such journey may differ by a significant amount for the two drivers. Several different driving profiles can be created, and the user profile analyzer component 206 can select one of such driving profiles. It can thus be discerned that an edge and/or node of the traffic system representation 108 can be weighted based at least in part upon a determined profile.

The predictive component 110 can further include a weight assignor component 208 that is utilized to assign weights to edges/nodes of the traffic system representation 108 based at least in part upon analysis undertaken by the context analyzer component 202, the road type analyzer component 204, and/or the user profile analyzer component 206. Referring back to the example above, the context analyzer component 202 can provide the weight assignor component 208 with road speeds at various contexts with respect to the at-issue road segment. The weight assignor component 208 can then weight an edge that represents the road segment at a particular context based at least in part upon the provided road speeds at related contexts. Additionally or alternatively, the road type analyzer component 204 can determine a type of road of the road segment and types of roads with respect to other road segments within the traffic system, and the weight assignor component 208 can weight the edge that represents the at-issue road segment based at least in part upon the road types. For instance, the edge can be assigned a weight that is similar to a weight assigned to an edge that represents a road segment with a road type similar to the at-issue road segment at similar contexts. Moreover, the weight assignor component 208 can weight the edge given a discerned user profile. For example, an estimated road speed can be reduced if the driving profile maps to a driver that travels more slowly than average drivers.

Figure 3:
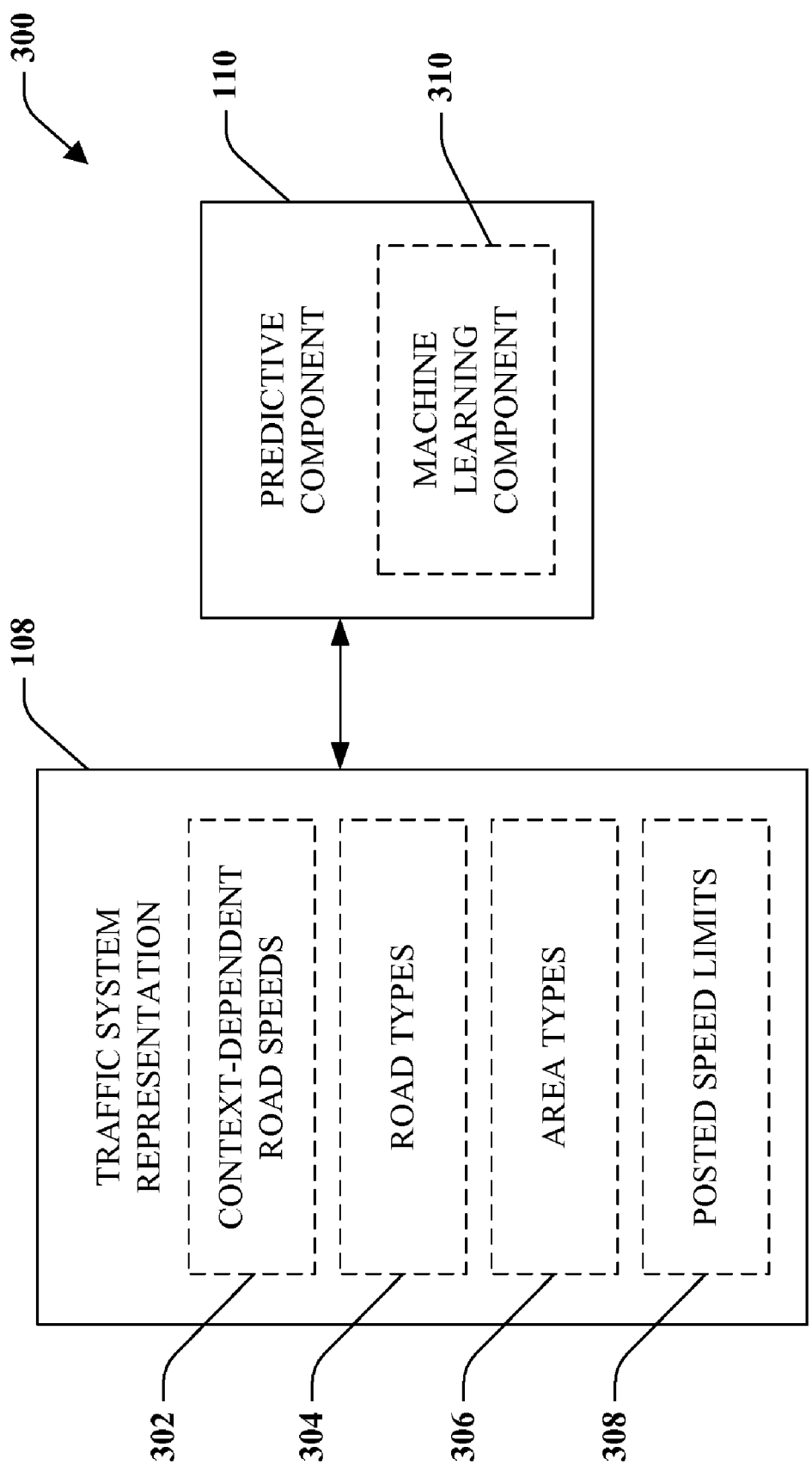
FIG. 3 illustrates a system that utilizes machine learning techniques/systems in connection with assigning travel velocity statistics to road segments.

Referring now to FIG. 3, a system 300 that facilitates assigning context-dependent road speeds to a traffic system representation is illustrated. The system 300 includes the traffic system representation 108, which is based at least in part upon data collected from drivers traveling in a traffic system represented by the traffic system representation 108. Collection of such data is described in more detail infra. The traffic system representation 108 can be and/or include a weighted graph, wherein nodes of the graph represent intersections and edges represent road segments between the intersections. The nodes/edges can be associated with context-dependent road speeds 302, such that flows of traffic are represented over different contexts. In a detailed example, road speeds can be determined for road segments given different days of the week, different times of the day, different weather conditions, etc. The context-dependent road speeds 302 can be ascertained by collecting location/velocity data within a traffic system through, for example, use of GPS receivers.

The traffic system representation 108 can also include road types, 304, area types 306, and/or posted speed limits 308 that are associated with each road segment and/or intersection represented within the traffic system representation 108. The road types 304 can describe whether road segments are two-lane roads, four lane roads, expressways, state highways, county highways, etc. The area types 306 can indicate types of areas that road segments lie within. For instance, a first road segment may reside within a commercial region while a second road segment may reside within an agricultural region. The area types 306 can further indicate types of terrain associated with road segments, such as mountainous, relatively flat, etc. The posted speed limits 308 can be associated with each road segment represented by the traffic system representation 108. Most conventional route planning applications include posted speed limits for roadways and utilize those limits to determine a route.

The system 300 additionally includes the predictive component 110. As described above, the predictive component 110 can employ a set of cascading rules in connection with assigning road speed statistics to road segments that are not associated with sensed/collected data. Additionally or alternatively, the predictive component 110 can analyze the traffic system representation 108 and infer road speeds for portions thereof through employment of a machine-learning component 310. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. The machine learning component 310 can employ various classification schemes and/or systems (e.g., support vector machines, neural networks, expert systems, Bayesian belief networks, fuzzy logic, data fusion engines . . . ) in connection with performing automatic and/or inferred action in connection with the claimed subject matter.

For instance, the machine learning component 310 can analyze the traffic system representation 108 and assign road speeds based at least in part upon the analysis. In a detailed example, the traffic system representation 108 can include representations of road segments and intersections at various contexts, such as time of day or day of week. However, it may be difficult or unreasonably expensive to obtain data from automobiles over all road segments in a traffic system at all desirable contexts. If some collected data exists, however, the predictive component 110 can intelligently estimate road speeds for each road segment with respect to every desirable context. For instance, the machine learning component 310 can access collected context-sensitive road speeds and analyze such road speeds in light of context associated therewith, road types, area types, posted speed limits, user profiles, etc. The machine learning component 310 can then perform data mining and locate patterns, trends, etc. within the traffic system representation given variables within the traffic system representation 108. For example, the machine learning component 310 can determine that a road speed with respect to a road of a first type in a first area given a first context is relatively similar to road speeds with respect to a road of a second type in a second area given the same context. This pattern can then be employed to assign road speeds to road segments represented within the traffic system representation at particular contexts, wherein the road segments are not associated with collected/sensed data.

Figure 4:
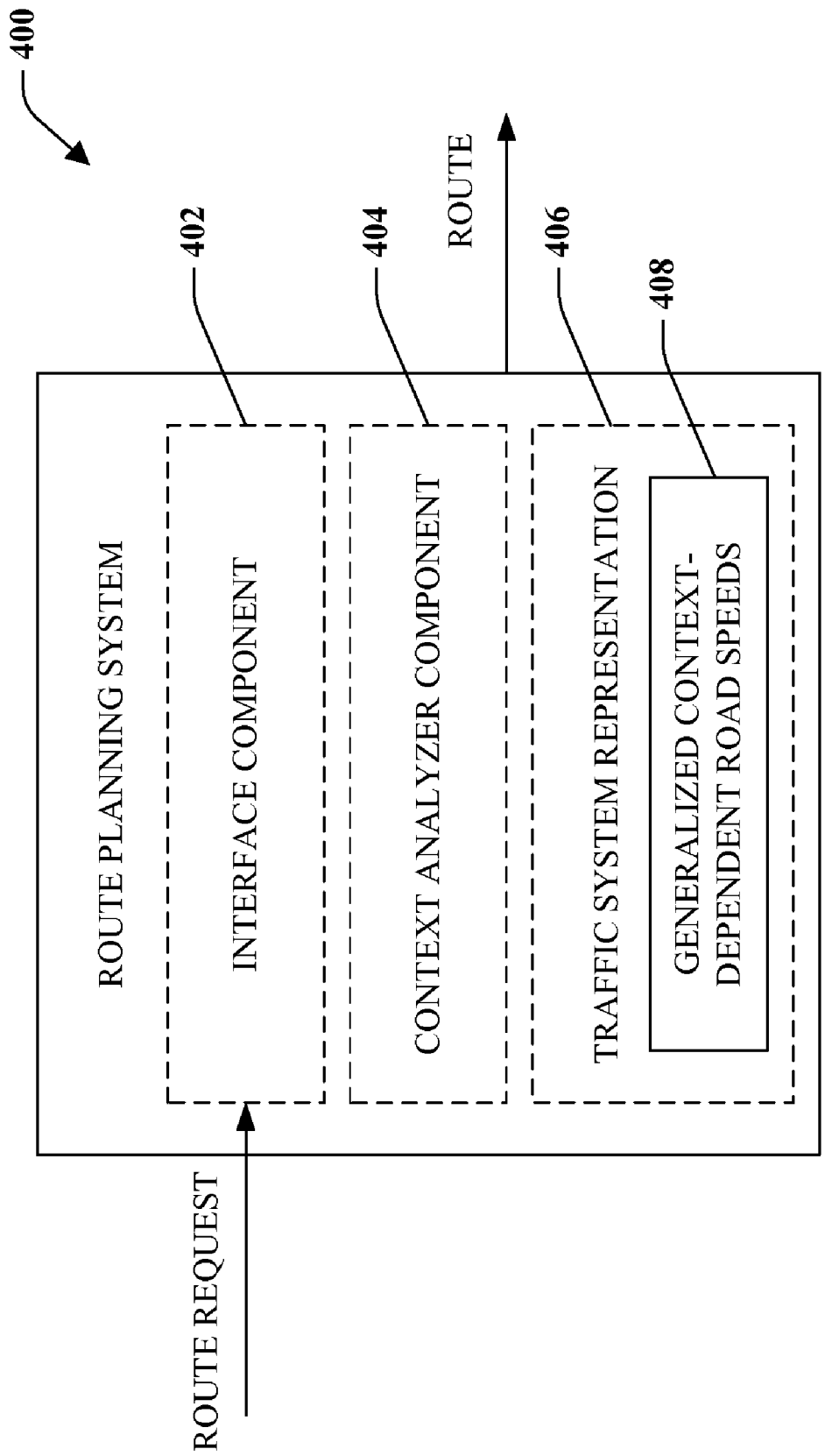
FIG. 4 illustrates a route planning system that outputs driving directions based at least in part upon predicted travel velocities for road segments.

Referring now to FIG. 4, a route planning system 400 that can output directions to a user that are based at least in part upon predicted/inferred context-dependent road speeds is illustrated. The route planning system 400 includes an interface component 402 that receives a request for directions from a user, wherein the request includes a beginning point and a destination point. The request can additionally include contextual data and/or indications of contextual data, such as when (time of day, day of week, time of year, etc.) the journey will be undertaken. The route planning system 400 can further include a context analyzer component 404 that analyzes contextual data associated with the route request. For example, the context analyzer component 404 can determine when the user will undertake the journey and access weather forecasts relating to the time and location(s) of the journey. A traffic system representation 406 can then be accessed based at least in part upon the request and contextual information associated therewith.

For instance, the traffic system representation 406 can be and/or include a weighted graph, where nodes of the graph represent intersections and edges represent road segments between intersections. The edges/nodes can be weighted based at least in part upon road speeds associated with the road segments/intersections that they represent. Furthermore, the weights can alter as context alters; thus, the traffic system representation 406 more accurately represents an actual traffic system (e.g., traffic flow of a particular road segment during rush hour is often quite different than traffic flow over the same road segment at midnight). At least some of the weights can be determined through monitoring automobiles as they travel through the traffic system over different contexts. Collecting data with respect to each road segment in a traffic system over different contexts, however, can be extremely time consuming and difficult. Accordingly, the traffic system representation 406 can include predicted/inferred context-dependent road speeds 408, wherein such speeds are predicted/inferred by the predictive component 110 (FIGS. 1-3). The predicted context-dependent road speeds 408 can be employed to complete/polish the traffic system representation 406. This enables the traffic system representation 406 to be a robust representation of a traffic system over different contexts. This representation 406 can then be employed in connection with outputting directions to the initiator of the request, wherein the directions can alter as context alters (e.g., an optimal route output by the route planning system 400 can alter given different contexts). The route planning system 400 is thus a major improvement over conventional route planning applications, which output routes that are independent upon context.

Figure 5:
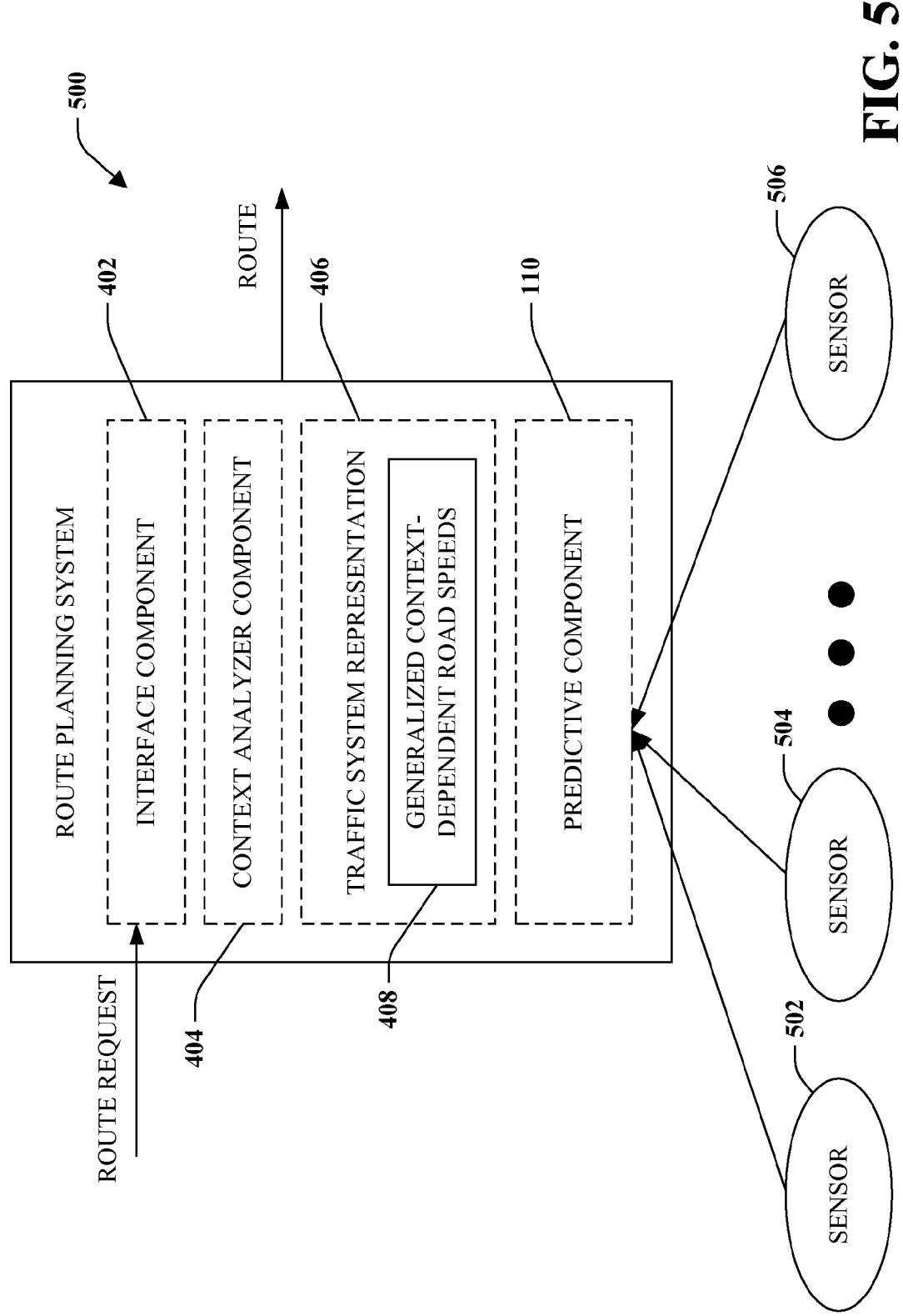
FIG. 5 is a block diagram of a route planning system that can be updated based upon sensed traffic parameters.

Referring now to FIG. 5, a route planning system 500 is illustrated. The route planning system 500 includes the interface component 402 that receives the request for directions from a user. The context analyzer component 404 analyzes context associated with the request, and the traffic system representation 406 is accessed to aid in outputting directions that are dependent upon context. The traffic system representation 406, as before, can include predicted context-dependent road speeds 408. In other words, the traffic system representation 406 can be based at least in part upon sensed road speeds from drivers in a traffic system as well as estimated road speeds created by the predictive component 110. Thus, context-dependent directions can be output by the route planning system 500.

The predictive component 110 can also be communicatively coupled to a plurality of sensors 502-506, wherein the sensors can be GPS receivers associated with automobiles, sensors on roadways indicating traffic flow, etc. The sensors 502-506 can be associated with ad hoc and/or structured sensing for collecting data (as may be picked up by cars/trucks carrying GPS systems while performing other tasks). As traffic systems are dynamic in nature, it may be desirable to update the traffic system representation 406 so that it reflects changing conditions. For example, construction on a particular road segment can drastically alter traffic flow not only with respect to the road segment but sometimes with respect to an entire traffic system. Additionally, once construction is complete (e.g., widening a two lane road to a four lane road), traffic flow can alter. Accordingly, the sensors 502-506 can be employed to provide updated data to the traffic system representation 406 as well as to the predictive component 110. The predictive component 110 can then update estimated speeds for road segments/intersections that are not associated with sensed data.

The route planning system 500 can also be used to generate a route for immediate use and/or can generate a route for the future (wherein such route may or may not be updated with sensed contextual information at that time). For example, a user can request directions between two points at a time in the future such that current sensed information (e.g., weather, road conditions, current traffic flows) may not be relevant when the user travels. Thus, one or more sensed parameters may be "ignored" when the route planning system 500 outputs directions.

The route planning system 500 can also have the capability to receive contextual data at a current point in time or a time t in the past and predict into the future by way of use of data sets that consider sensed traffic flows at different times in the future from the observation. Additionally or alternatively, statistics time-series methods can be utilized to predict evolution of traffic given a current or recent traffic states. Such predictions may be useful for long trips, such that predicted road speeds can be generated at times a vehicle is expected to reach certain points given a starting time.

Figure 6:
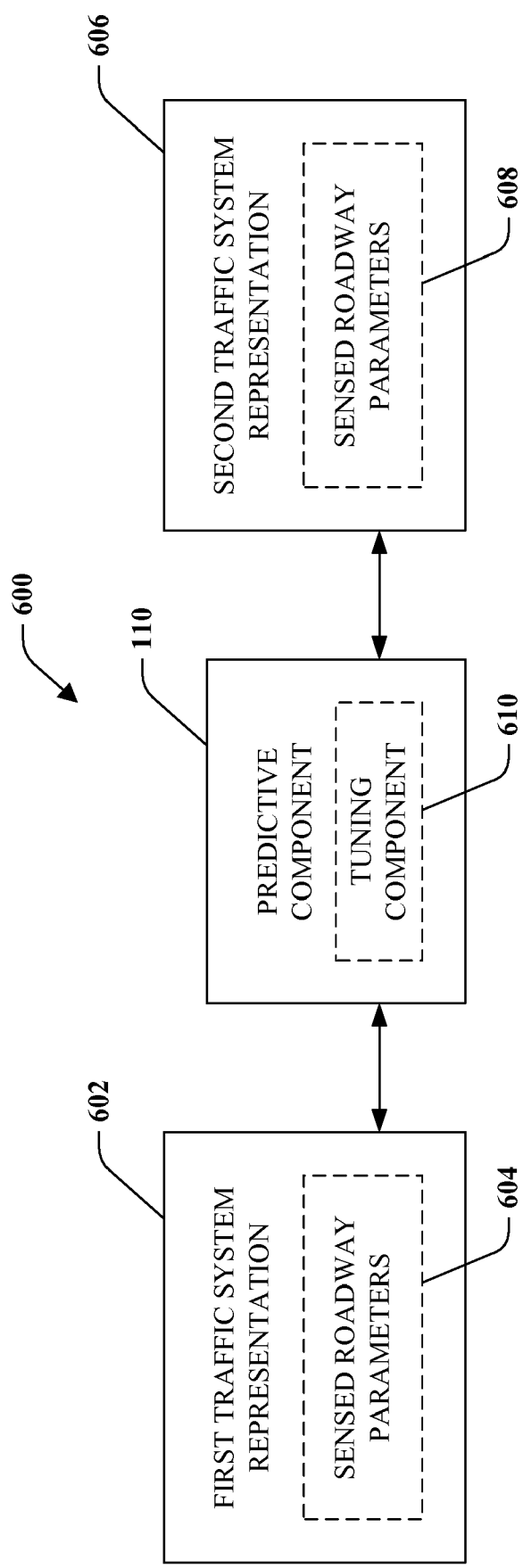
FIG. 6 is a block diagram of a system that facilitates assigning road velocity statistics to road segments in a first traffic system based at least in part upon sensed road velocities of road segments in a second traffic system.

Turning now to FIG. 6, a system 600 that facilitates generalizing between two disparate traffic systems is illustrated. The system 600 includes a first traffic system representation 602 that is based at least in part upon sensed roadway parameters 604. As described above, the sensed roadway parameters 604 can be obtained from sensors associated with automobiles that travel through a traffic system represented by the first traffic system representation 602. Additionally, the first traffic system representation 602 can include information related to road segment types, posted speed limits, terrain associated with road segments, and the like.

The system 600 can also include a second traffic system representation 606 that is based at least in part upon sensed roadway parameters 608, wherein the sensed roadway parameters 608 include data collected from drivers traveling in the traffic system represented by the second traffic system representation 606. In more detail, the first traffic system representation 602 can represent a traffic system associated with a first city while the second traffic system representation 606 can represent a traffic system associated with a second city. The system 600 can also include the predictive component 110 that is utilized to assign roadway speed statistics to representations of road segments within the first traffic system representation 602, wherein such road segments are not associated with collected data with respect to particular contexts.

In this example system 600, the first traffic system representation 602 can be associated with a significant amount of sensed roadway data. For instance, several automobiles can be equipped with location/velocity devices and can be tracked over time. In contrast, the second traffic system representation 606 may be associated with much less sensed data. The predictive component 110 can compare the first traffic system representation 602 with the second traffic system representation 606 and assign road speed statistics to representations of road segments within the second traffic system representation 606 based at least in part upon the comparison. Pursuant to an example, the predictive component 110 can compare the sensed roadway parameters 604 and 608 and determine correlations therebetween. For instance, the sensed roadway parameters 604 can include a road speed for a segment that is of a particular road type, wherein the sensing occurred at a particular time on a weekday. The sensed roadway parameters 606 can similarly include a road speed for a segment that is of the same road type, wherein the data was sensed at a similar time on a weekday. This data can be compared to determine similarities therebetween (and to determine discrepancies therebetween). Once the sensed roadway parameters 604 and 606 have been compared, the predictive component 110 can assign road speeds to representations of road segments within the second traffic system representation 606 based upon the comparison.

A tuning component 610 can be utilized modify assigned road speed statistics based upon general driving differences that exist between the two traffic systems represented by the traffic system representations 602 and 606. For example, a first traffic system may be associated with Dallas, Tex. while a second traffic system may be related to Detroit, Mich. Pursuant to an example, drivers in Dallas may, on average, drive more rapidly than drivers in Detroit (due to, for example, hazardous weather conditions that are more apt to occur within Detroit). Thus, road speeds may not map exactly between cities over road segments with similar posted speed limits and road types. The tuning component 610 can recognize these driving discrepancies between traffic systems and cause predicted road speed statistics to be compensated accordingly. Thus, in summary, the predictive component 110 can be utilized to predict/infer road speed statistics and assign road speed statistics to a traffic system representation that is not associated with a substantial amount of data based at least in part upon sensed driving data from a different traffic system.

Figure 7:
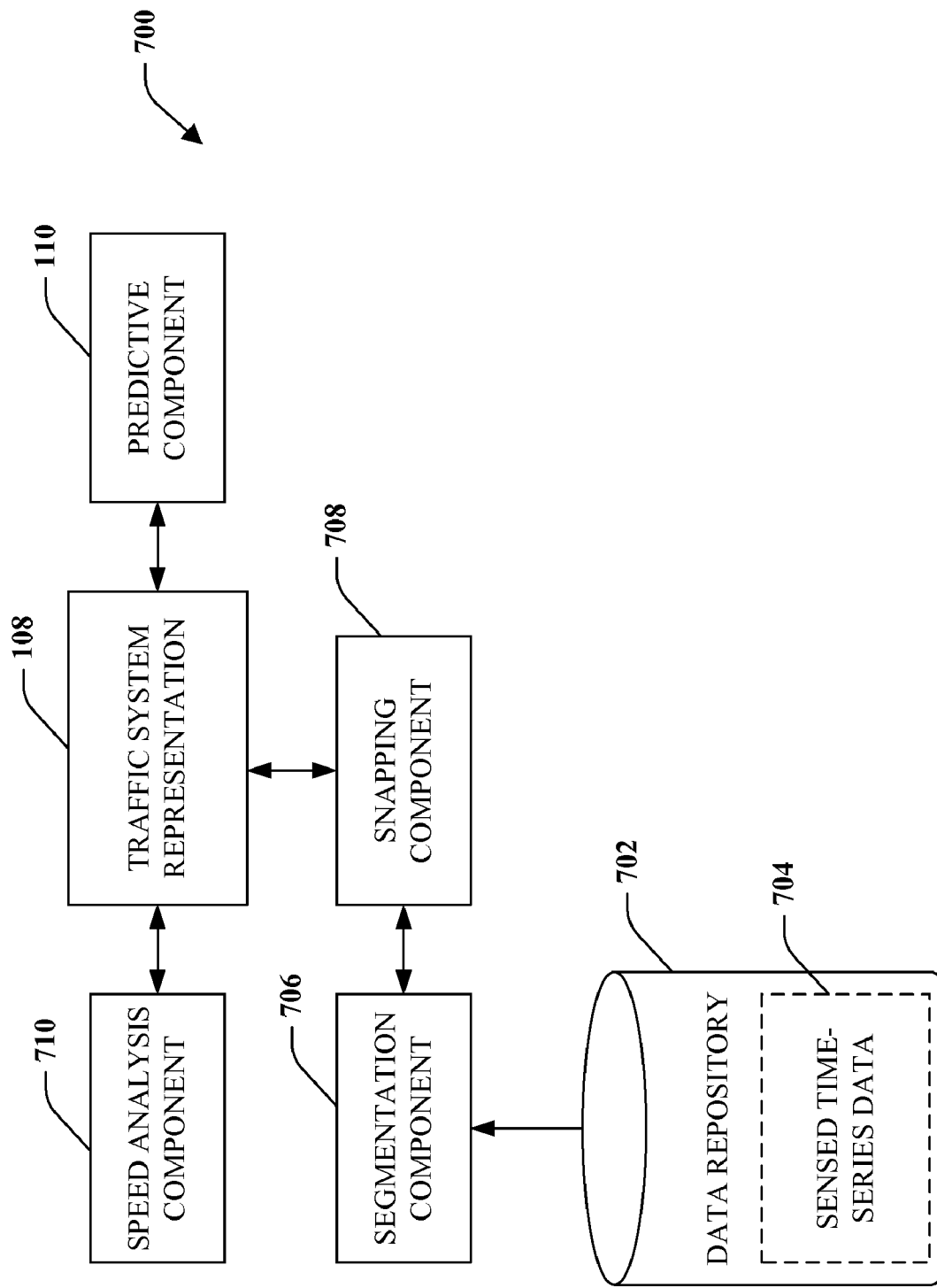
FIG. 7 is a block diagram of a system that facilitates building/defining a robust traffic system representation.

Referring now to FIG. 7, a system 700 for building a robust traffic system representation is illustrated. The system 700 includes a data repository 702 that includes sensed time-series data 704, wherein such data can be collected from a plurality of drivers as they travel through a traffic system. For example, the sensed time-series data 704 can be obtained by associating location/velocity-determining sensors (such as GPS receivers) with a plurality of drivers in a traffic system (e.g., a metropolitan traffic system). As data is generated from the sensors, such data can be associated with time-stamps. Thus, trace logs for each respective driver associated with the location-determining sensor(s) are generated and can be placed within the sensed time-series data 704. Additionally, the sensors can be configured to record/output data only when a vehicle is in motion, and can automatically cease recording/outputting after the vehicle is immobile for a threshold time and/or when the vehicle is shut off. The sensors can again record/generate data when the vehicle associated therewith begins to travel. A segmentation component 706 can be employed to discern when individual journeys stop and start. As sensors associated with automobiles stop recording when the automobiles stop moving for a threshold amount of time, most (but not all) individual journeys taken by the drivers can be identified by the segmentation component 706 through reviewing time gaps that appear in the sensor logs.

Some situations exist, however, where it may not be easy to discern where a journey started and stopped. For example, a driver may stop for a short period of time to drop off a passenger. To locate such situations, for instance, the segmentation component 706 can analyze logs within the sensed time-series data to determine when a loop has been made (e.g., from location A to location B to location A). If the segmentation component 706 detects a loop, then a segmentation point can be chosen at a point in the loop that is physically furthest from where the loop closes.

The traffic system representation 108 can be built/defined based at least in part upon the sensed time-series data 704, and can be or include a graph, where nodes in the graph represent intersection of roads and edges represent road segments. A single road may be represented by multiple edges, as each road segment (the smallest unbroken portion of a road between two intersections) can be a separate edge in the graph. Additionally, the edges and nodes can be associated with latitudes and longitudes of roads that they represent. Once the sensed time-series data 704 has been segmented into individual journeys, such journeys can be "snapped" to the traffic system representation 108. This may be problematic in that, for example, noise can be associated with GPS signals. Additionally, the traffic system representation 108 may be imperfect; for instance, two different maps may pinpoint a particular latitude/longitude position at slightly different locations relative to surrounding features in each representation. Thus, the sensed time-series data 704 when mapped to the traffic system representation 108 may not fit perfectly.

A snapping component 708 can be employed to "snap" each collected data point to an appropriate location represented within the traffic system representation 108. For instance, the snapping component 708 can snap each collected data point to an on-road location nearest to it, and trace logs can be reconstructed by connecting the on-road locations together by way of the shortest on-road paths between each consecutive pair. In another example, the snapping component 708 can employ a Hidden Markov Model in connection with snapping trace logs to a graph within the traffic system representation 108. Informally, the Hidden Markov Model can consider potential snaps for each raw piece of collected data $o_i$, and can select a best on-road snap $s_i$ for each such that a resulting sequence of on-road locations is as smooth as possible while maintaining proximity between the raw data and respective snapped locations. The set of possible snap locations for a single raw piece of sensed data (e.g., GPS point) $o_i$ is created by collecting, for each road segment within a threshold distance of $o_i$, a location $s_i$ for each road segment that is most proximate to $o_i$. Several candidate $s_i$ locations can result where a road network is dense while fewer result in areas of sparse road coverage.

Formally, the Hidden Markov Model that can be employed by the snapping component 708 can define the following joint probability over sequences of raw and snapped sensed locations (O and S, respectively), from which a maximum-probability sequence of snapped locations for a particular trace log can be deduced using the standard Viterbi algorithm:

$$P(S, O) = \prod_i P(o_i|s_i)P(s_i|s_{i-1})$$

The first term in the product is the observation probability: how likely would the observation $o_i$ have been if, for example, the GPS receiver had actually been at on-road location $s_i$? This probability can be given by error characteristics of GPS receivers, for example, modeled as a zero-mean Gaussian with a standard deviation of a particular distance (e.g., 10 meters). The second term in the product is the transition probability: how likely would the on-road location $s_i$ have been if the sensing device was known to be at location $s_{i-1}$ when the previous measurement was recorded? This can be defined as the fraction a/b, where a is the straight-line distance from $s_{i-1}$ to $s_i$ and b is the length of the shortest on-road path between the same. Such a definition may penalize transitions that round corners, emphasizing the idea that turns are relatively rare during travel. The false "penalty" incurred by two consecutive points on a curved road is negligible because location data can be collected at relatively high frequency (e.g., every six seconds or less). Additionally, transitions between distant snap locations can be penalized, since generally there is no on-road, straight-line path between them. It can be noted that a/b <1, and the snapping component 708 can normalize such that transition probabilities emanating from each node of the Hidden Markov Model sum to one.

In another example, the snapping component 708 can use an alternative definition for the transition probability. Namely, a value can be assigned with magnitude that is inversely proportional to the number of "hops" (road segment transitions) in the transition. In this case, a pair of points for which the shortest on-road connecting path includes three road segments will have a lower probability than a pair of points on the same segment. Another alternative for transition probability is to use a single, fixed probability for transitions between points on the same road and separate, lower probability transitions for different roads. Defining such probabilities, however, can be a difficult task: a large ratio between two probabilities may result in on-road routes that remain on a single road to the point of ignoring collected data, while a small ratio may place too much emphasis on potentially noisy readings.

Once the trace logs are mapped into road segments, a speed analysis component 710 can associate different weights to edges/nodes within the graph of the traffic system representation 108 over different times. For example, the speed analysis component 710 can learn time-dependent traffic speed for roads by breaking days of the week into multiple categories and breaking such categories into several time slices. For purposes of illustration, it can be assumed that the speed analysis component 710 breaks the days of the week into two categories: weekdays and weekends. Such categories can then be broken into 96 time slices: 15-minute blocks of time covering 24 hours of the day. It is understood, however, that the speed analysis component 710 can create categories associated with any sort of contextual data. For instance, the speed analysis component 710 can create categories based upon weather conditions, holidays, and the like.

Continuing with the above example, the speed analysis component 710 can learn a separate speed for each time-of-day and weekday/weekend breakdown by examining each pair (A, B) of consecutive GPS points in snapped traces. The speed of a driver between each pair can be calculated, and the speed can be utilized to create a running average for every road segment traversed to get from A to B. Speed measurements can be applied to the running average associated with a block of time whose time characteristics match those of timestamps of collected data involved in the speed calculation. Thus, the speed analysis component 710 can determine speeds associated with road segments in various categories (time of day, day of week, The speed analysis component 710 can then associate such data with the traffic system representation 108, such that edges and nodes are weighted based upon the collected data.

It can be discerned, however, that it may be impossible to obtain data for every road in a traffic system over every category. Thus, road speeds can be generalized given known road speeds of "similar" road segments. In more detail, the predictive component 110 can analyze the traffic system representation 108 and provide speed values to road segments that are not associated with collected data for each category. For instance, for road segments and time segments where no data is available, the predictive component 110 can assign the speed that is associated with the same road segment at an adjacent time block. If there is no speed associated with an adjacent time block, the predictive component 110 can assign the segment a speed from a similar road and/or a system-wide average of speeds from similar roads, where similarity can be defined by road class within the traffic system representation 108. Additionally, similarity can be determined by analyzing speed limits, geographic proximity of road segments, geographic location of road segments, and the like. Still further, if similar roads cannot be located and/or if a system-wide speed average is unavailable, the speed for a time segment can be defined as the posted speed limit. Moreover, as described above, the predictive component 110 can utilize machine-learning techniques/systems to learn patterns/correlations within the traffic system representation 108 and assign road speeds to road segments based at least in part upon learned patterns, correlations, and/or trends.

Figure 8:
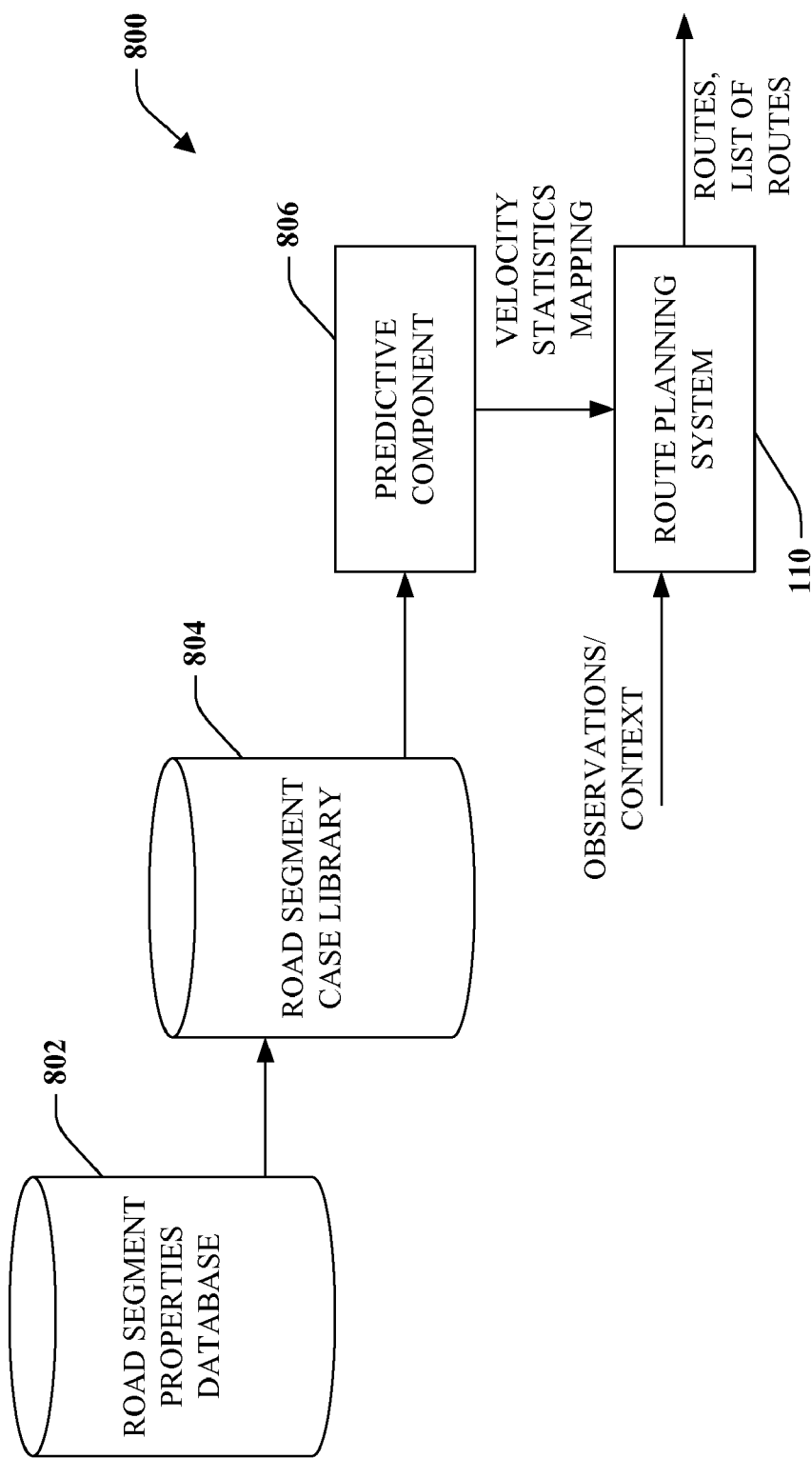
FIG. 8 is an example block diagram illustrating a system that outputs routes based upon predicted travel velocities of one or more road segments.

Referring now to FIG. 8, a system 800 that is provided to illustrate flow of data in connection with outputting a route between two points is illustrated. The system 800 includes a road segment properties database 802, which can comprise data relating to road segments that are associated with sensed data, including road segment properties, proximal terrain, nearby resources, and other suitable data. Such information can be part of a road segment case library 804, which can also be associated with logged data relating to one or more road segments within the road segment properties database 802. For example, the road segment case library 804 can include or receive data from several heterogeneous sources, such as logged GPS data, data from road sensors, calendars of events, a clock indicating time of day, and the like. When combined with data from the road segment properties database 802, relationships and properties amongst roads can be computed.

The predictive component 110 can receive such relationships and properties and assign context and structure sensitive velocity statistics to roads not associated with sensed data. A route planning system 806 can receive a driving request between two points, and the route planning system 806 can output a route through use of the context-sensitive velocity statistics. For instance, the route planning system 806 can utilize a Dykstra algorithm, an A* algorithm, variants thereof, and/or any other suitable search algorithm to determine directions that accord to user preferences (e.g., time, distance, and/or risk preferences). Furthermore, the route planning system 806 can receive a time preference (e.g., the user will be traveling the route in a few days rather than right now) and output directions based at least in part upon the provided time. In such a case, the route planning system 806 can ignore real-time data received from sensors if such data is subject to change. If outputting directions for a current time, the route planning system 806 can receive and contemplate real-time and/or cached observations when outputting directions to the user.

Referring now to FIGS. 9-12, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
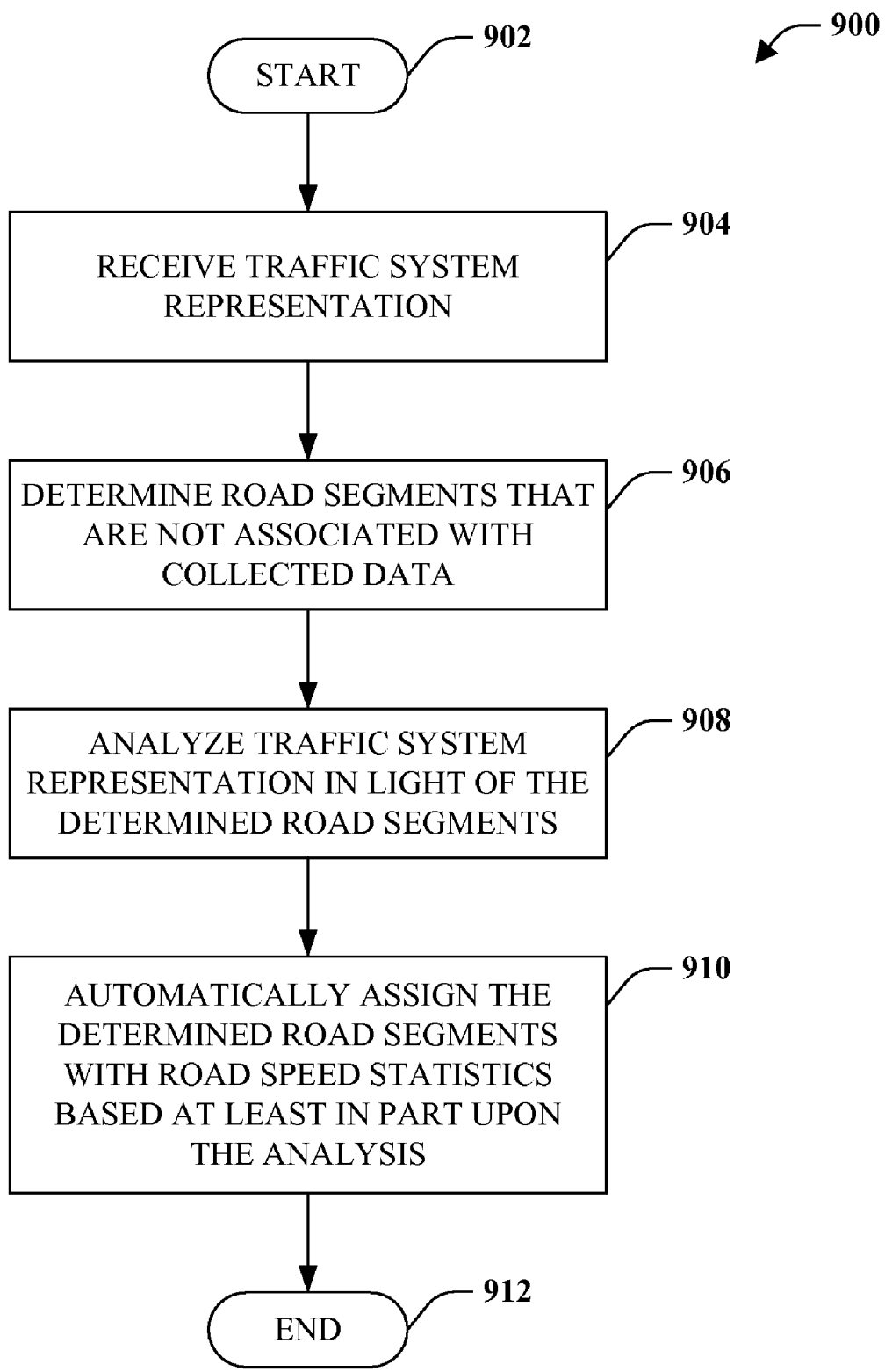
FIG. 9 is a representative flow diagram of a methodology for estimating travel velocities with respect to road segments in a traffic system.

Referring specifically to FIG. 9, a methodology 900 for automatically estimating/predicting road speed statistics for road segments in a traffic system is illustrated. The methodology 900 starts at 902, and at 904 a traffic system representation is received. The traffic system representation can include representations of road segments and intersections, sensed velocities with respect to automobiles traveling along road segments and/or through intersections, road segment type, area encompassing road segments, posted speed limits, and the like. Furthermore, the traffic system representation can be and/or include a weighted graph, where nodes represent intersections and edges represent road segments between intersections. The edges and nodes can be weighted, for example, to represent speeds related to the road segments/intersections. Furthermore, the weights can alter as a function of context. Thus, a weight associated with an edge on a first day can be different from a weight associated with the same edge on a second day.

At 906, the traffic system representation is reviewed to determine road segments that are not associated with collected data for each contextual category. Pursuant to an example, the traffic system representation can be created such that weights can alter as time of day and day of week change. Thus, a single road segment can be desirably associated with several road speed statistics (e.g., different weights for each day of the week and each time of day therein). Thus, road segments can be determined where there is not a speed determined for each desired contextual category (e.g., each time of day for each day of week). At 908, the traffic system representation is analyzed in light of the determined road segments. For example, sensed location/velocity data associated with same or similar road segments can be analyzed to determine patterns/correlations between road segments. Such analysis has been described in greater detail supra.

At 910, road velocity statistics with respect to the road segments determined at 906 are automatically assigned based at least in part upon the analysis. In other words, for example, weights can be provided to the edges and/or nodes of the graph that are within the traffic system. The weights can be assigned through utilization of several cascading rules, through machine learning techniques/systems, etc. The methodology 900 completes at 912.

Figure 10:
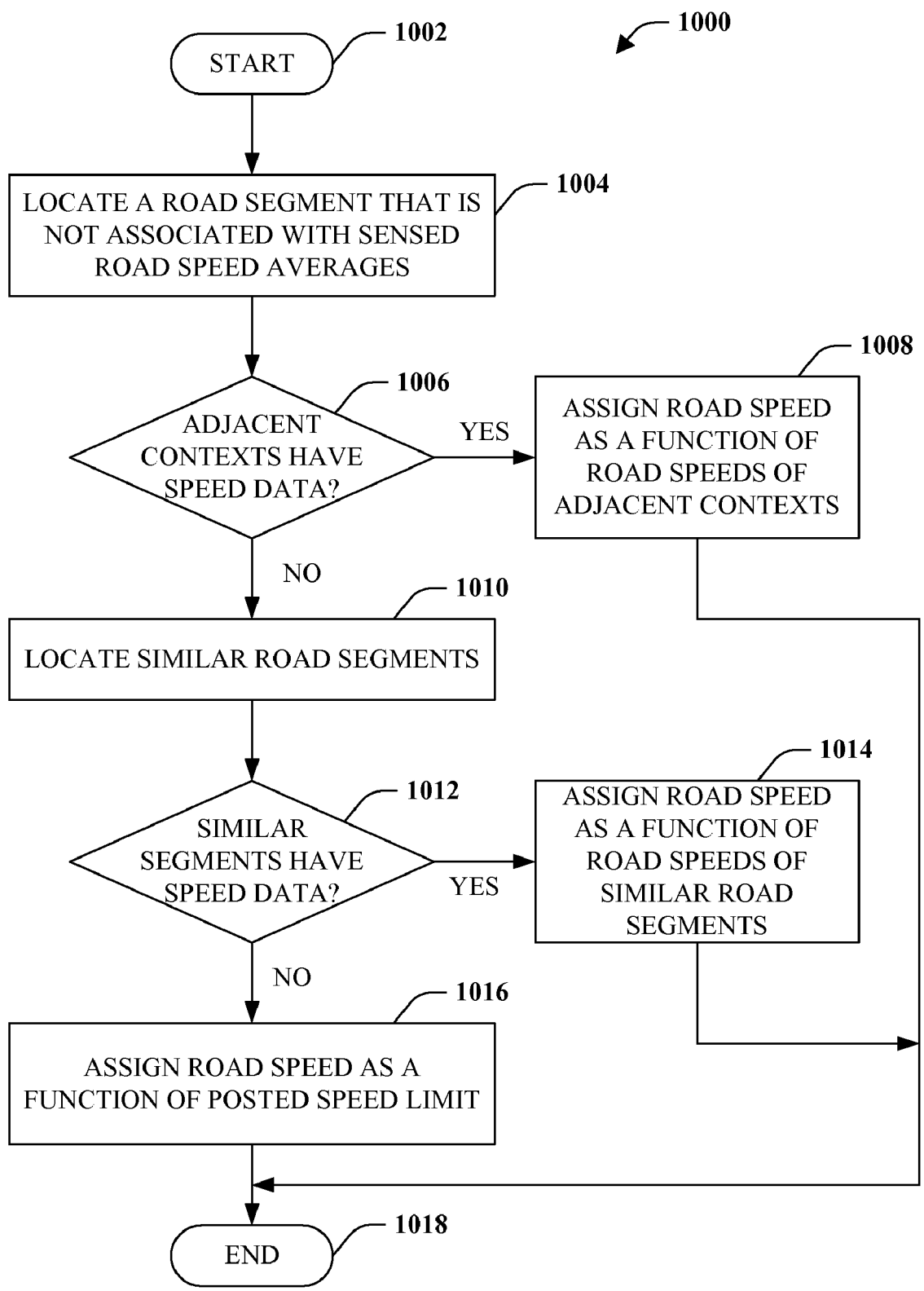
FIG. 10 is a representative flow diagram of a methodology for utilizing cascading rules in connection with assigning travel velocities for road segments represented within a traffic system representation.

Now referring to FIG. 10, a methodology 1000 for assigning road speed statistics to representations of road segments in a traffic system representation is illustrated. The methodology 1000 starts at 1002, and at 1004 a road segment that is not associated with sensed road speeds for each context category is determined. For instance, as stated above, the traffic system representation can represent actual traffic systems, wherein traffic flow is different when given different contexts (e.g., there is more traffic during rush hour than outside of rush hour). At 1006, a determination is made regarding whether related contexts for the same road segment are associated with road speed data. For instance, if the traffic system representation alters over fifteen minute time blocks, and a road segment is not associated with a sensed road speed for at least one of such blocks, adjacent time blocks with respect to the road segment are analyzed to determine if road speeds exist with respect to such time blocks. It is understood that time is but one example, as road segments can be associated with road speed given particular days of week, weather conditions, sporting events, etc. If there exists road speed data with respect to related contexts over the same road segment, then at 1008 a road speed can be assigned to the road segment with respect to a particular context as a function of road speeds of the road segment with respect to related contexts.

If there is no road speed data with respect to the road segment given related contexts, then at 1010 similar road segments can be located. Similarity can be based upon assigned road type (e.g., two lane, four lane, length of a road segment between intersections, . . . ), terrain of an area that includes the roads, posted speed limits, or any other suitable data that can be indicative of similarity between roads. At 1012, a determination is made regarding whether the similar road segments have been assigned speed data (particularly for a similar context with respect to which road speed data is desired). If the similar segments are associated with road speed data, then at 1014 a road speed can be assigned to the road segment located at 1004 as a function of the road speeds assigned to the similar road segments. If there are no road speeds assigned to the similar road segments, then at 1016 a road speed can be assigned as a function of a posted speed limit associated with the road segment. The methodology 1000 then completes at 1018.

Figure 11:
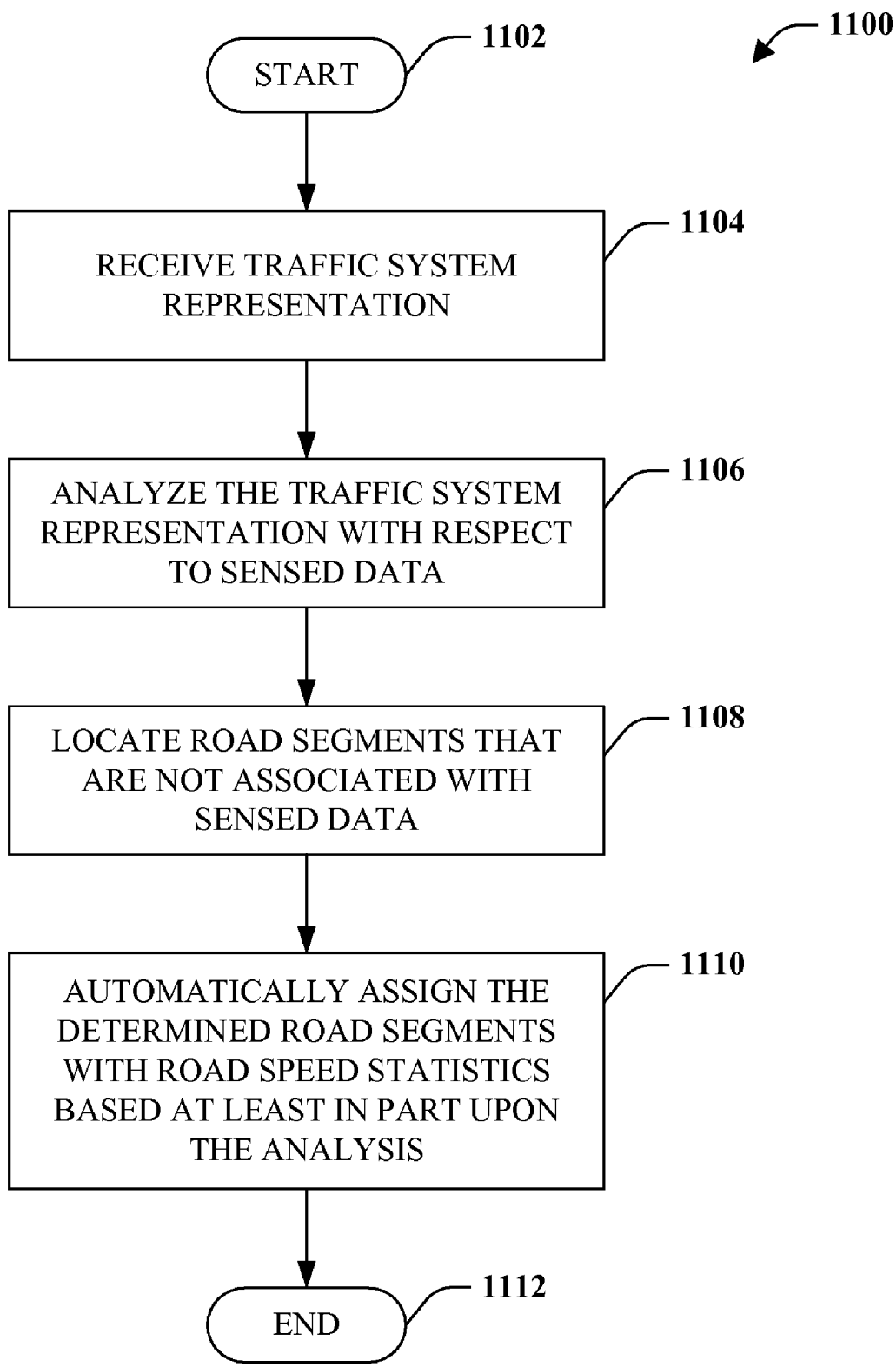
FIG. 11 is a representative flow diagram of a methodology for utilizing machine-learning to assign travel velocities to road segments represented within a traffic system representation.

Turning now to FIG. 11, a methodology 1100 for automatically assigning road speeds to road segments in a traffic system is illustrated. The methodology 1100 starts at 1102, and at 1104 a traffic system representation is received. The traffic system representation can include road segment representations, intersection representations, sensed velocities associated with road segments and/or intersections given different contexts, type of road segments, terrain associated with road segments, posted speed limits, and the like. At 1106, the traffic system representation is analyzed with respect to the sensed data. For instance, Bayesian systems, artificial neural networks, support vector machines, or any other suitable machine-learning systems/techniques can be employed in connection with analyzing the traffic system representation. This analysis can result in determination of patterns, correlations, and/or trends with respect to similar road segments over similar contexts.

At 1108, road segments that are not associated with sensed data for each categorized context are located. At 1110, road speeds are automatically assigned to road segments located at 1108 based at least in part upon the analysis. Thus, sensed data with respect to a traffic system given particular contexts can be reasoned over to determine road speeds that can be assigned to other road segments within a traffic system. The methodology 1100 then completes at 1112.

Figure 12:
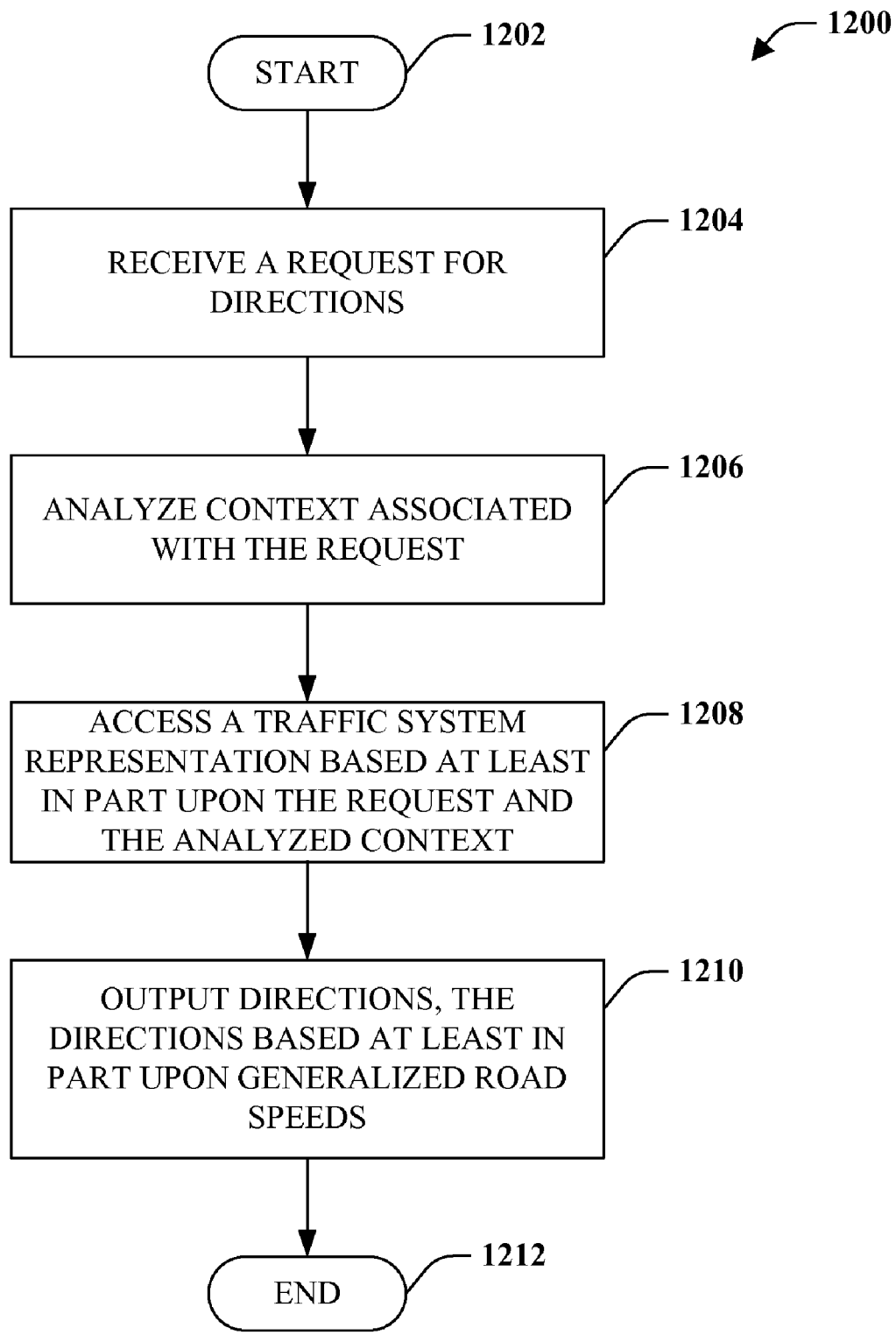
FIG. 12 is a representative flow diagram for outputting driving directions based at least in part upon predicted travel velocities.

Now turning to FIG. 12, a methodology 1200 for utilizing estimated/assigned road speeds for particular road segments over various contexts in connection with outputting driving directions is illustrated. The methodology 1200 starts at 1202, and at 1204 a request is received for driving directions between a provided beginning point and an ending point. The request can be received by way of the Internet, for example. Additionally or alternatively, a route planning application can be existent within an automobile, and the request for directions can be provided through an interface on a console of an automobile, for instance. At 1206, a context associated with the request can be analyzed. For example, the initiator of the request can provide information regarding when a journey will be undertaken. Furthermore, current or predicted weather conditions can be analyzed, events associated with the journey can be analyzed, etc.

At 1208, directions are output, where the directions are based at least in part upon predicted/inferred/forecast road speeds. For instance, a traffic system representation can be utilized in connection with outputting directions, wherein the traffic system is sensitive to context. Pursuant to a particular example, the traffic system representation can include a weighted graph that is representative of a traffic system, wherein nodes of the graph represent intersections, edges represent road segments associated with the intersections, and weights that are associated with the edges/nodes are representative of road speeds of the road segments/intersections given varying contexts. Therefore, driving directions output through use of the traffic system representation can be different between the same two points given different contexts (just as an optimal route between two points during rush hour can differ from an optimal route between the same two points at midnight). At lease some of the road speeds within the traffic system representation can be estimated/predicted/ assigned through analyzing sensed data associated with road segments given particular contexts. Determining road speeds has been described in detail above. The methodology 1200 then completes at 1212.

Figure 13:
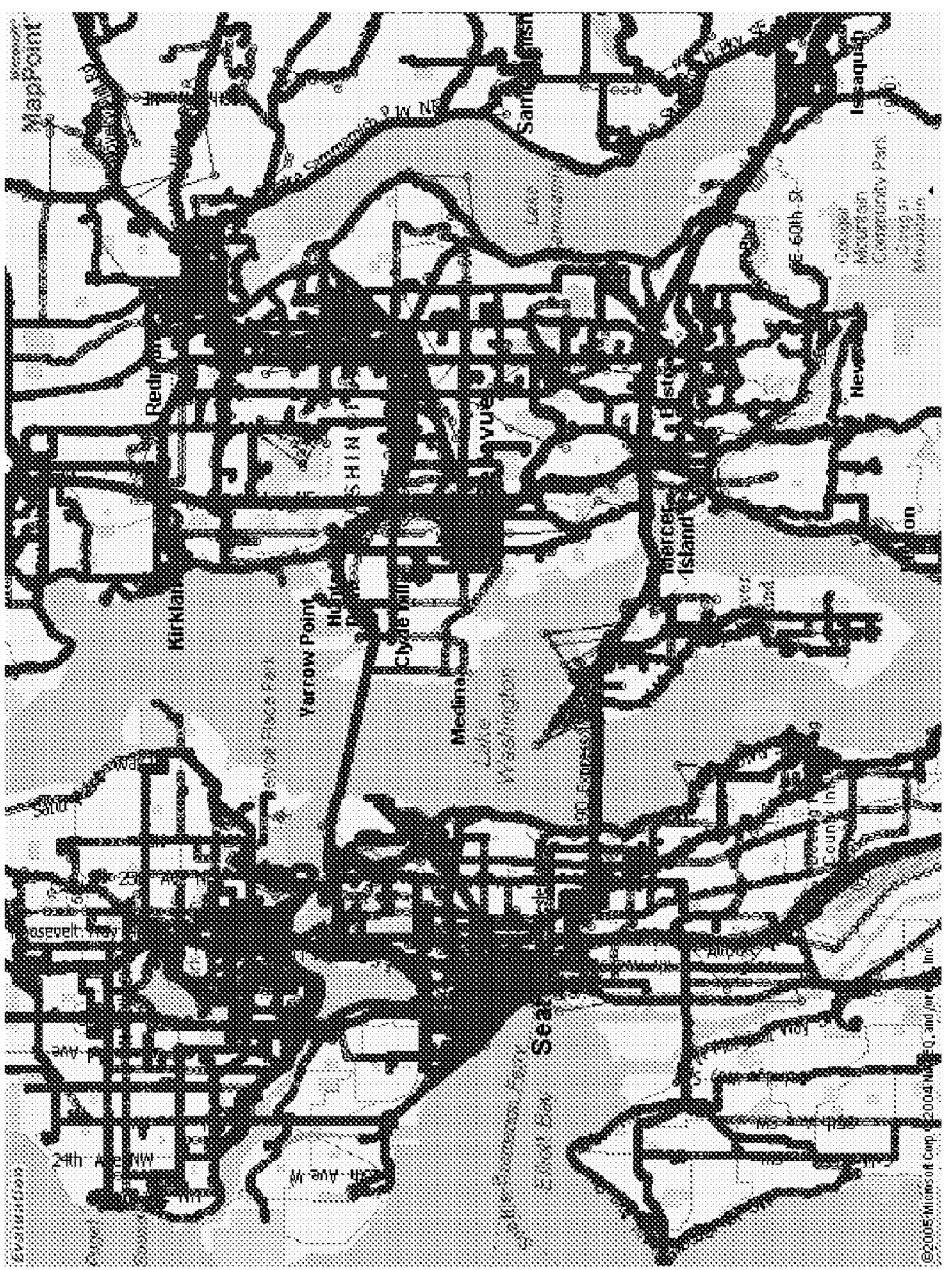
FIGS. 13 and 14 are screenshots illustrating collection of traffic data from automobiles in a traffic system.
Figure 14:
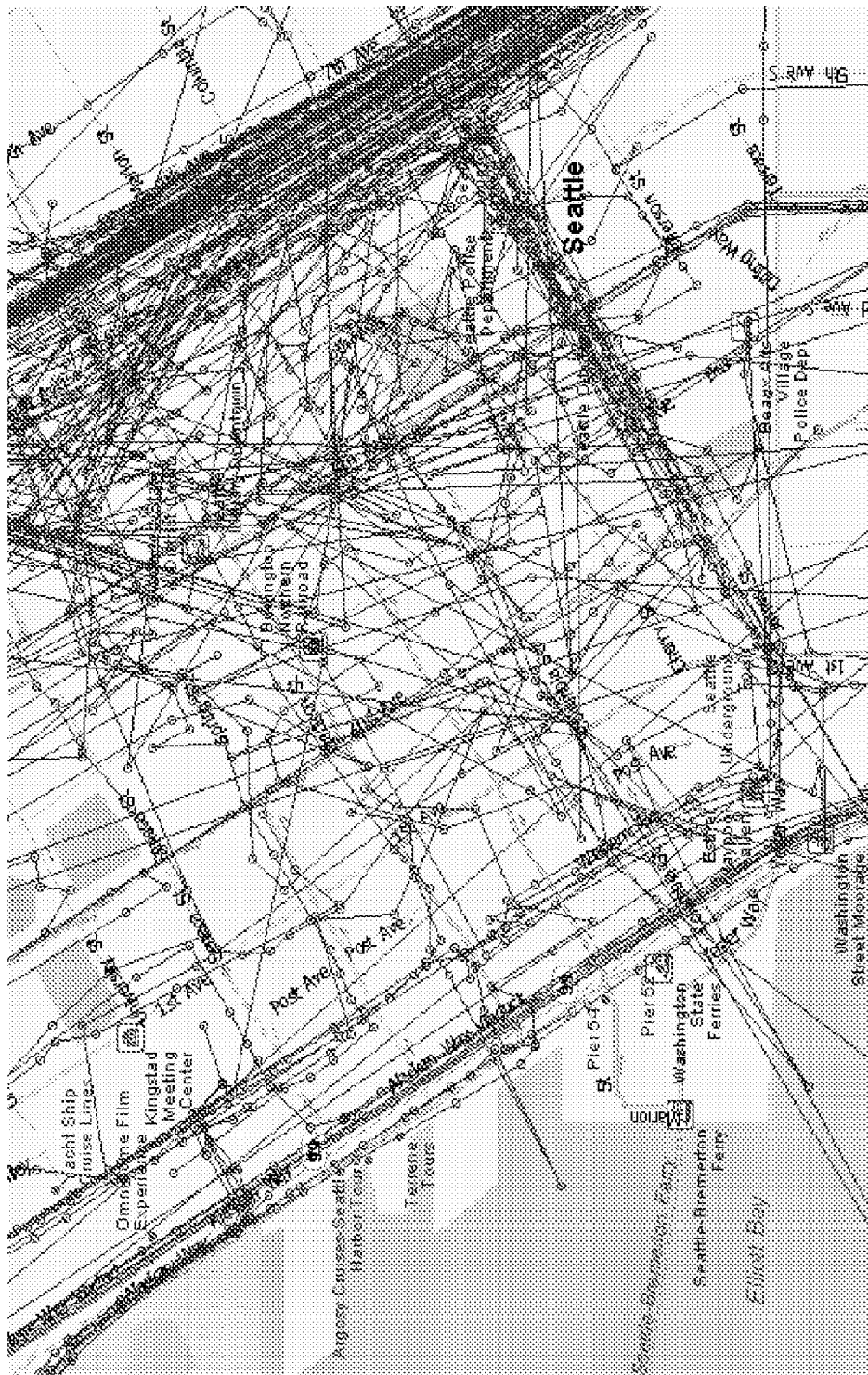

Referring collectively to FIGS. 13 and 14, screenshots 1300 and 1400 of a map overlaid with data points associated with location-sensors in automobiles is illustrated. The screenshot 1300 shows a high-level view of a metropolitan area where data has been collected, and the screenshot 1400 includes a more detailed illustration of collected data points overlaying a map. These data points can be associated with a plurality of different drivers over time. It can also be discerned upon viewing the screenshot 1400 that the data points often do not map to roadways, even though most of such data points were taken from vehicles on such roadways. Therefore, it is important to carefully "snap" these data points to roadways to enable creation of a robust traffic flow representation over different contexts. In one example, a Hidden Markov Model can be utilized in connection with snapping data points to associated road segments.

Figure 15:
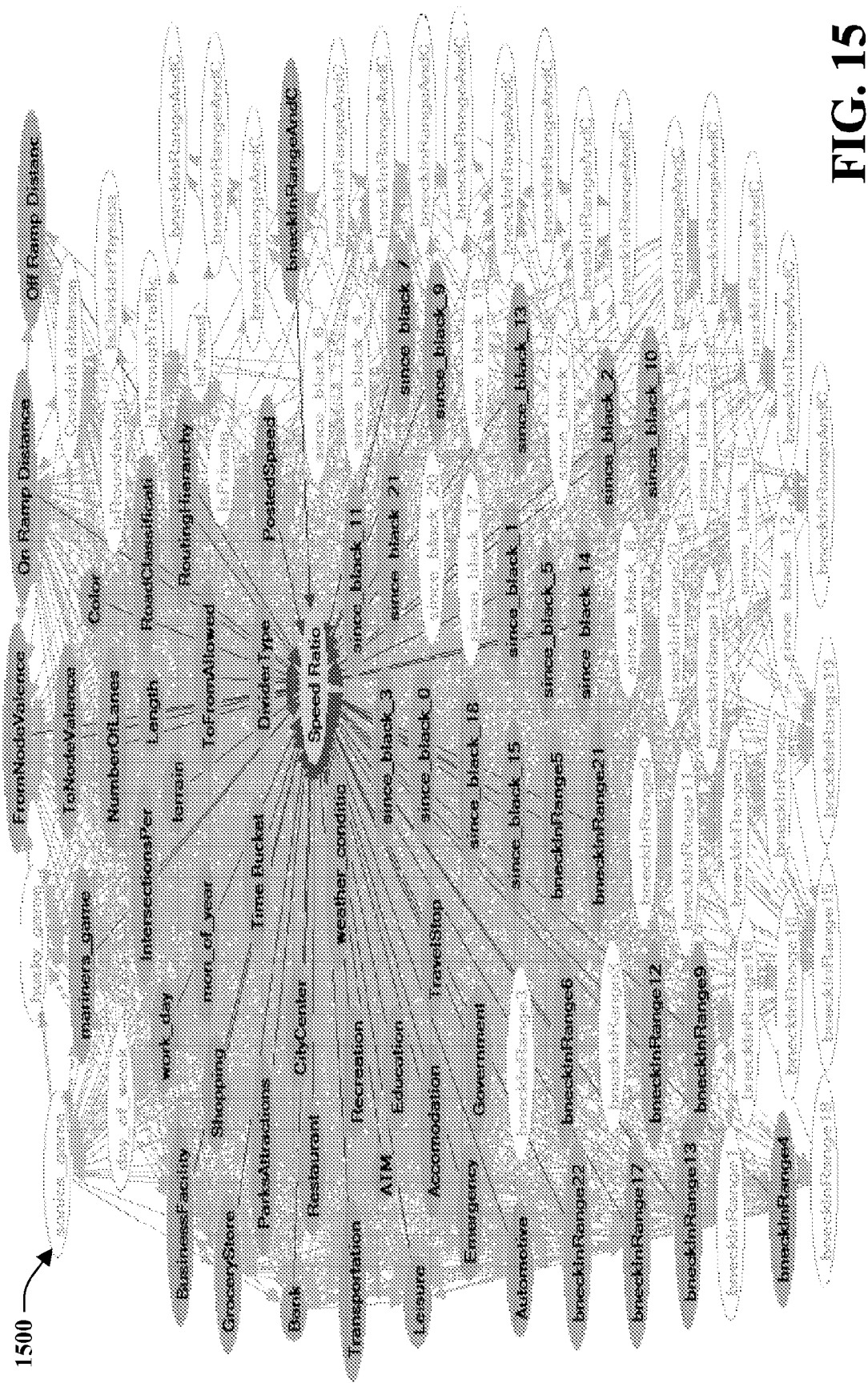
FIG. 15 is an example Bayesian model.

Turning to FIG. 15, an example Bayesian model 1500 that can be employed in connection with predicting velocity statistics over one or more road segments is illustrated. The Bayesian model 1500 is designed to consider one or more parameters in connection with predicting velocity statistics with respect to one or more road segments. For example, various sensors can determine time of day, day of week, and other contextual information that may have an affect on travel velocities over road segments. Additionally, type of roads can be contemplated within the Bayesian model 1500, including whether it is a two-lane or four lane road, public or private, and the like Still further, status and relationships amongst traffic flows in different road segments can have an affect on probability distributions over road segments to change. For example, current bottlenecks on certain road segments can have an impact on expected travel velocity over a different road segment. The example Bayesian model 1500 is provided to illustrate example parameters that can be employed in connection with predicting road speed statistics.

Figure 16:
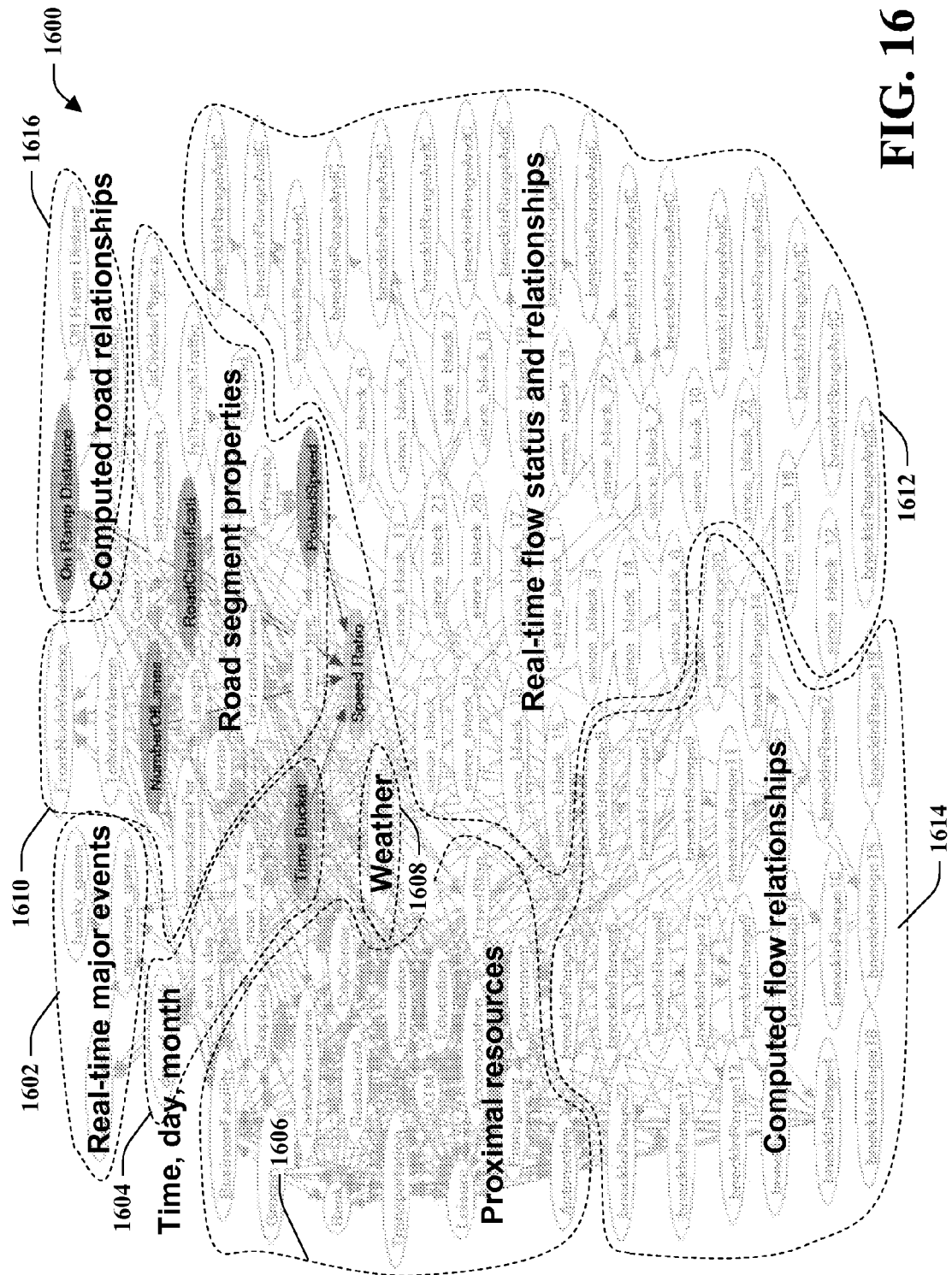
FIG. 16 is an example model that can be employed in connection with predicting and/or forecasting travel velocity statistics and outputting directions.

Now referring to FIG. 16, an example model 1600 that can be utilized by the predictive component 110 (FIGS. 1-3, 5-8) to predict road velocities and/or velocity ratios for unsensed road segments given certain contexts is illustrated. The model 1600 can also be employed in connection with outputting directions between points to a user, wherein such directions can be based upon inferences made with respect to one or more road segments. The model 1600 can take into account real-time major events, computed road relationships (e.g., geographic similarities, geographic proximity, . . . ), weather, road segment properties, proximal resources, such as locations of ATMs, services, and the like, real-time status and flow relationships (obtained from sensors), and weather. Certain combinations of variables can be utilized to accurately predict/estimate velocities over particular road segments given different contexts, and thus used to output directions to users that are dependent upon context.

In more detail, to determine a speed ratio or other suitable velocity statistic, real-time major events 1602 can be considered, including sporting events, cultural events, and/or the like. Additionally, time, day, and month data 1604 can have an affect on one or more predicted velocity statistics. Additionally, predicted velocity statistic(s) can be dependent upon proximal resources 1606, such as amusement parks, shopping, etc. Weather 1608 can have an affect on travel velocities (e.g., drivers tend to drive more slowly when raining versus when it is sunny). Moreover, road segment properties 1610, including number of lanes, posted speed limits, and other suitable properties can be taken into account within the model 1600 when predicting velocity statistics for one or more road segments.

Still further, real-time flow status and relationships 1612 of road segments can cause an expected velocity to change. For instance, if a bottleneck is detected at a particular location, such bottleneck can cause expected velocity statistics to alter at that location and also multiple other locations because of causal flow-centric associations via connections as well as by higher-order effects given multiple relationships and influences throughout the traffic system. In the general case, computed flow relationships 1614, such as how bottlenecks and flows influence one another at different times (now and at various times in the future), can be considered for one or more road segments when predicting travel velocity statistics. Finally, the model 1600 can account for computed road relationships 1616, such as geographic proximity, distance to and from an on or off ramp, etc.

Figure 17:
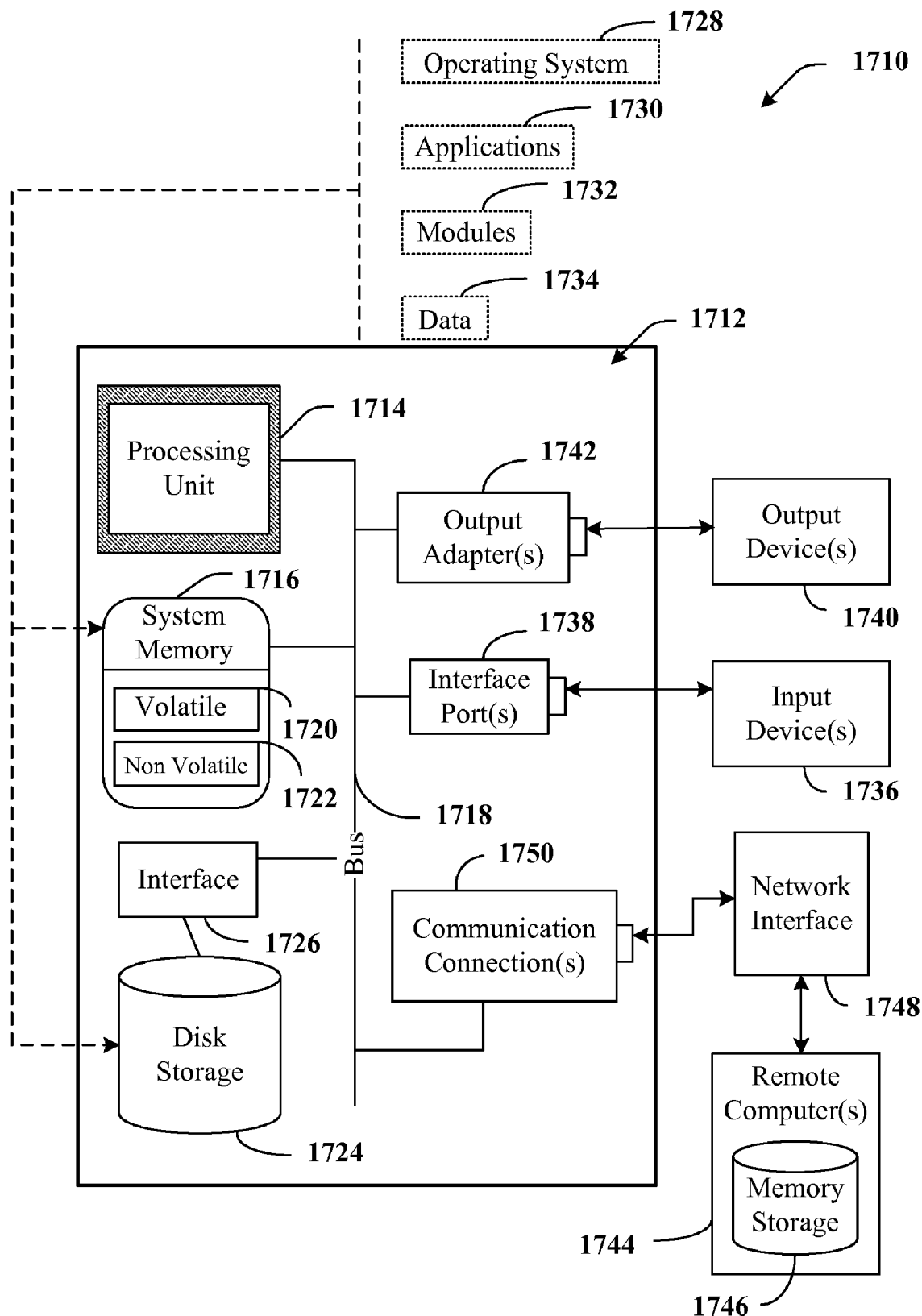
FIG. 17 is a schematic block diagram illustrating a suitable operating environment.

In order to provide additional context for various aspects of the claimed subject matter, FIG. 17 and the following discussion are intended to provide a brief, general description of a suitable operating environment 1410 in which various aspects may be implemented. While the claimed subject matter is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the features described herein. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 17, an exemplary environment 1710 that can be employed in connection with estimating road speeds for road segments in a traffic system includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI). The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable ROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/nonremovable, volatile/nonvolatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). For instance, a DVD-ROM drive can be employed in connection with reading video content from a DVD. To facilitate connection of the disk storage devices 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the subject invention can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, remote control, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapter 1742 is provided to illustrate that there are some output devices 1740 like monitors, speakers, and printers among other output devices 1740 that require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

Figure 18:
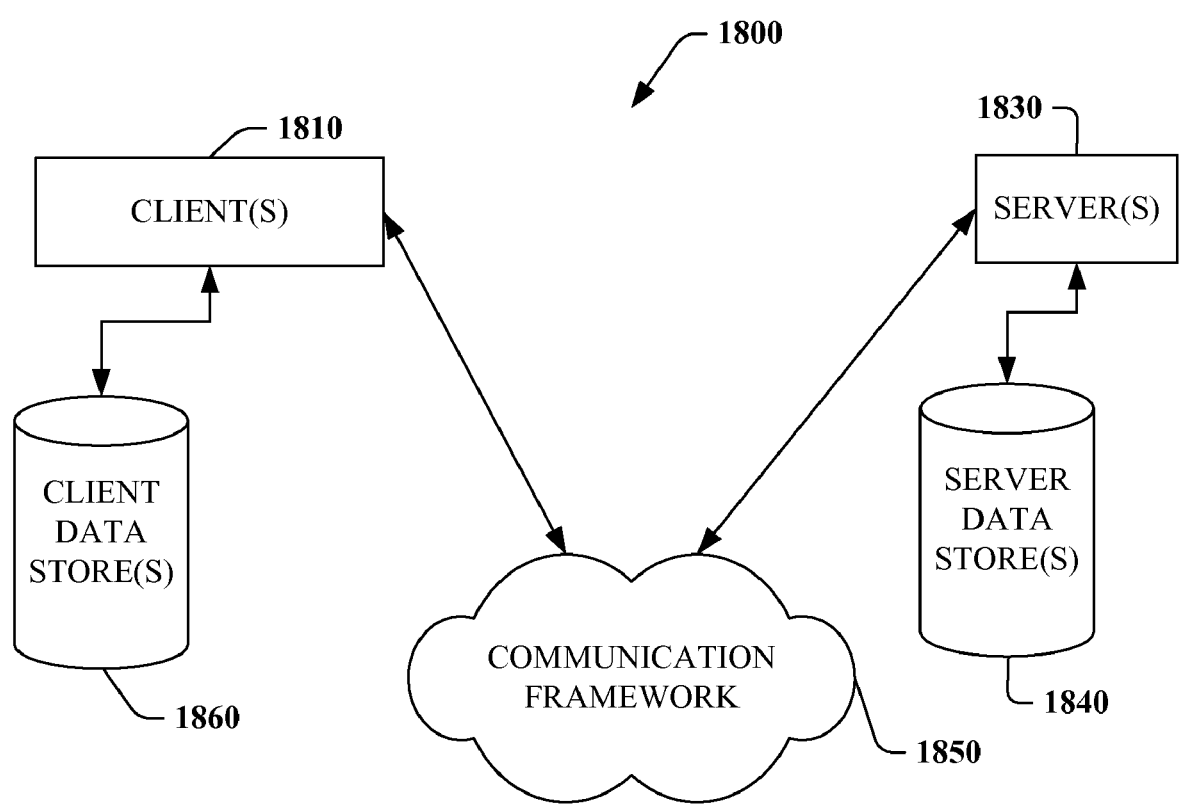
FIG. 18 is a schematic block diagram of a sample-computing environment.

FIG. 18 is a schematic block diagram of a sample-computing environment 1800 with which the claimed subject matter can interact. The system 1800 includes one or more client(s) 1810. The client(s) 1810 can be hardware and/or software (e.g., threads, processes, computing devices). The system 1800 also includes one or more server(s) 1830. The server(s) 1830 can also be hardware and/or software (e.g., threads, processes, computing devices). The servers 1830 can house threads to perform transformations by employing the claimed subject matter, for example. One possible communication between a client 1810 and a server 1830 can be in the form of a data packet adapted to be transmitted between two or more computer processes. The system 1800 includes a communication framework 1850 that can be employed to facilitate communications between the client(s) 1810 and the server(s) 1830. The client(s) 1810 are operably connected to one or more client data store(s) 1860 that can be employed to store information local to the client(s) 1810. Similarly, the server(s) 1830 are operably connected to one or more server data store(s) 1840 that can be employed to store information local to the server(s) 1830. In one particular example, the server(s) can include a route planning system that is accessible to a client by way of a network. Users can request driving directions from the route planning system by submitting a request to the route planning system within the server by way of the client and the network, and the route planning system can then output resultant driving directions to the client.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates predicting road speeds or probability distributions over speeds for road segments not associated with sensed data for all desired contexts, comprising:
    a receiver component that receives a traffic system representation, the traffic system representation includes sensed velocities for at least a portion of a plurality of road segments over different contexts; and
    a predictive component that
        determines that a sensed velocity is not available for a first road segment of the plurality of road segments; and
        analyzes the traffic system representation and automatically assigns at least one of an average velocity and a probability distribution over velocities to the first road segment within the traffic system representation, by:

identifying at least one similar road segment that is similar to the first road segment and for which sensed velocities are available in a context, and predicting, for the context, at least one of the average velocity and the probability distribution over velocities for the first road segment based on the sensed velocities available for the identified at least one similar road segment.

2. The system of claim 1, the predictive component comprises a machine learning component that utilizes machine learning techniques to determine patterns and trends within the traffic system representation between road segments, the predictive component assigns the at least one of the average velocity and the probability distribution over velocities based at least in part upon the determined patterns and trends.

3. The system of claim 1, the predictive component comprises a context analyzer component that determines a sensed velocity with respect to the road segment given a different context, the predictive component assigns the at least one of the average velocity and the probability distribution over velocities as a function of the sensed velocity given the different context.

4. The system of claim 1, the predictive component comprises a road type analyzer component that locates sensed velocities associated with road segments that are labeled with a similar road type as the road segment, the predictive component assigns the at least one of the average velocity and the probability distribution over velocities as a function of the sensed velocities associated with the road segments of similar type as the road segment.

5. The system of claim 1, the traffic system representation includes a weighted graph, where nodes represent intersections, edges represent road segments of the plurality of road segments between the intersections, and weights are based at least in part upon statistics representing road velocities of the road segments.

6. The system of claim 5, the weights within the traffic system representation alter as context alters.

7. The system of claim 5, the traffic system representation includes context-dependent road speeds, data indicating road types of road segments, data indicating relationships to other roads, roads associated with traffic flow problems, data indicating posted speed limits, data indicating type of terrain, data indicating businesses and services, and types of buildings that are associated with road segments.

8. The system of claim 5, the predictive component analyzes real-time sensed parameters and automatically assigns at least one of the average velocity and the probability distribution over velocities to the road segment based at least in part upon spatial relationships between road segments and the real-time sensed parameters, the real-time sensed parameters include at least one of location of accidents, weather, and sensed traffic flows.

9. The system of claim 1, further comprising a second traffic system representation, the predictive component assigns one or more velocity statistics to a road segment within the second traffic system representation based at least in part upon the analysis of the traffic system representation.

10. The system of claim 1 being a route planning system, the route planning system utilizes at least one of a Dykstra, A*, variant of Dykstra, and variant of A* search algorithm together with at least one of the average velocity and the probability distribution over velocities to output a route between points to a user.

11. The system of claim 10, the output route is for one of a current time and a time in the future, the route planning system outputs the route based at least in part upon predictions of contextual data, wherein the predictions are based upon evidence collected at a previous point in time.

12. The methodology of claim 11, further comprising:
receiving a request for driving directions; and
outputting driving directions based at least in part upon the request and the automatically predicted travel velocity statistics.

13. The methodology of claim 12, further comprising outputting the driving directions for a future time of travel, wherein at least one currently sensed parameter is ignored when outputting the driving directions.

14. The methodology of claim 13, further comprising utilizing at least one of a Dykstra, A*, variant of Dykstra, and variant of A* search algorithm for outputting the directions.

15. A methodology for predicting statistics relating to velocities on road segments within a traffic system representation comprises:
with at least one processor:
analyzing sensed data associated with a traffic system, the sensed data includes travel velocity statistics over at least a portion of the road segments given different contexts;
determining that travel velocity statistics are not available for a first road segment of the road segments; and
automatically predicting a travel velocity statistic for the first road segment based at least in part upon the analysis, by:
identifying at least one similar road segment that is similar to the first road segment and for which sensed data is available in a context, and
predicting, for the context, the travel velocity statistic for the first road segment based on the sensed data available for the identified at least one similar road segment.

16. The methodology of claim 15, analyzing the sensed data comprises reasoning over the sensed data to determine correlations between road segment types and average travel velocities.

17. The methodology of claim 15, further comprising utilizing at least one of ad hoc and structured sensing for obtaining travel velocity statistics with respect to road segments within the traffic system.

18. The methodology of claim 15, further comprising analyzing the traffic system representation to locate representations of road segments that are not assigned one or more statistics representing travel velocities for each desired context.

19. The method of claim 15, further comprising analyzing at least one of context-dependent road speeds, data indicating road types of road segments, data indicating relationships to other roads, roads associated with traffic flow problems, data indicating posted speed limits, data indicating type of terrain, data indicating businesses and services, and types of buildings that are associated with road segments in connection with automatically predicting travel velocity statistics with respect to road segments.

20. A system comprising computer-implemented means that, when executed by a processor, create a robust traffic system representation, the computer-implemented means comprising:

- computer-implemented means for receiving sensed travel velocity statistics with respect to at least a portion of road segments in a travel system;
- computer-implemented means for analyzing, by the processor, the sensed travel velocity statistics;
- computer-implemented means for determining that travel velocity statistics are not available for a first road segment of the road segments; and
- computer-implemented means for predicting a travel velocity statistic over a plurality of contexts for the first road segment based at least in part upon the analysis, by:
    - identifying at least one similar road segment that is similar to the first road segment and for which sensed data is available in the plurality of contexts, and
    - predicting, for the plurality of contexts, the travel velocity statistic for the first road segment based on the sensed data available for the identified at least one similar road segment.

* * * * *